US012101484B2

United States Patent
Andersson et al.

(10) Patent No.: US 12,101,484 B2
(45) Date of Patent: *Sep. 24, 2024

(54) VIRTUAL BOUNDARY PROCESSING FOR ADAPTIVE LOOP FILTERING

(71) Applicant: Telefonaktiebolaget LM Ericsson (publ), Stockholm (SE)

(72) Inventors: Kenneth Andersson, Gävle (SE); Jacob Ström, Stockholm (SE); Zhi Zhang, Solna (SE); Jack Enhorn, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,156

(22) Filed: May 4, 2023

(65) Prior Publication Data
US 2023/0362382 A1 Nov. 9, 2023

Related U.S. Application Data

(63) Continuation of application No. 17/724,883, filed on Apr. 20, 2022, now Pat. No. 11,689,725, which is a
(Continued)

(51) Int. Cl.
*H04N 19/105* (2014.01)
*H04N 19/117* (2014.01)
(Continued)

(52) U.S. Cl.
CPC ......... *H04N 19/132* (2014.11); *H04N 19/105* (2014.11); *H04N 19/117* (2014.11); *H04N 19/176* (2014.11); *H04N 19/82* (2014.11)

(58) Field of Classification Search
CPC .................................................. H04N 19/132
See application file for complete search history.

(56) References Cited

U.S. PATENT DOCUMENTS 10,104,397 B2 * 10/2018 Hu .......................... H04N 19/51
10,123,048 B2 * 11/2018 Chen ...................... H04N 19/70
(Continued)

FOREIGN PATENT DOCUMENTS

| JP | 2013-118605 | 6/2013 |
| WO | 2019/060443 | 3/2019 |

(Continued)

OTHER PUBLICATIONS

International Search Report and Written Opinion issued in International Application No. PCT/SE2020/051131 dated Feb. 3, 2021 (15 pages).
(Continued)

*Primary Examiner* — Irfan Habib
(74) *Attorney, Agent, or Firm* — Rothwell, Figg, Ernst & Manbeck, P.C.

(57) ABSTRACT

A method for encoding or decoding an image. The method includes obtaining a coding tree block (CTB) having a vertical size (CtbSizeY) and a horizontal size (CtbSizex), the CTB comprising set of sample values associated with the image, the set of sample values comprising a current sample value having a location (x,y) within the CTB, where x is a horizontal value and y is a vertical value. The method also includes selecting a filter strength value for the current sample based on y and filtering the current sample using the selected filter strength value. Selecting a filter strength value for the current sample based on y comprises: i) determining whether the following first condition is true: (y==(CtbSizeY-5) OR y==(CtbSizeY-4)) AND var==1, where var is a variable that is set equal to 1 as a result of a determination that a second condition is satisfied; and ii) choosing a filter strength value of 10 as a result of determining that the first condition is true.

21 Claims, 21 Drawing Sheets

Related U.S. Application Data continuation of application No. 17/323,502, filed on May 18, 2021, now Pat. No. 11,317,095, which is a continuation of application No. PCT/SE2020/051131, filed on Nov. 26, 2020.

(60) Provisional application No. 62/953,310, filed on Dec. 24, 2019.

(51) Int. Cl.
 *H04N 19/132* (2014.01)
 *H04N 19/176* (2014.01)
 *H04N 19/82* (2014.01)

(56) References Cited

U.S. PATENT DOCUMENTS

| | | | | |
|---|---|---|---|---|
| 10,609,417 | B2* | 3/2020 | Chao | H04N 19/439 |
| 10,827,169 | B2* | 11/2020 | Gamei | H04N 19/593 |
| 11,044,473 | B2* | 6/2021 | Hu | H04N 19/186 |
| 2013/0044809 | A1 | 2/2013 | Chong et al. | |
| 2013/0272624 | A1* | 10/2013 | Budagavi | H04N 19/172 |
| | | | | 382/239 |
| 2014/0086501 | A1 | 3/2014 | Ikeda et al. | |
| 2017/0324962 | A1 | 11/2017 | Karczewicz et al. | |
| 2018/0098065 | A1* | 4/2018 | Karczewicz | H04N 19/14 |
| 2020/0204801 | A1* | 6/2020 | Hu | H04N 19/176 |
| 2021/0021847 | A1 | 1/2021 | Moon et al. | |
| 2021/0127111 | A1* | 4/2021 | George | H04N 19/174 |
| 2021/0203972 | A1* | 7/2021 | Chen | H04N 19/105 |
| 2021/0266604 | A1* | 8/2021 | Du | H04N 19/136 |
| 2021/0274170 | A1* | 9/2021 | Du | H04N 19/46 |

FOREIGN PATENT DOCUMENTS

| | | |
|---|---|---|
| WO | 2019/131400 | 7/2019 |
| WO | 2019/137750 | 7/2019 |
| WO | 2019/190280 | 10/2019 |
| WO | 2020/077351 | 4/2020 |
| WO | 2020/249123 | 12/2020 |
| WO | 2020/256413 | 12/2020 |
| WO | 2020/262396 | 12/2020 |
| WO | 2020/264457 | 12/2020 |

OTHER PUBLICATIONS

Andersson, K., et al., "Fix for ALF Virtual Boundary Processing," JVET and ISO/IEC JTC 1/SC 29/WG 11, 17th meeting Brussels, JVET-Q0150 (Jan. 2020) (8 pages).

Andersson, K., et al., "Additional Fix for ALF Virtual Boundary Processing," JVET and ISO/IEC JTC 1/SC 29/WG 11, 18th meeting, JVET-Q0150-V2 (Apr. 2020) (7 pages).

Chen, C., et al., "CE5-1: Adaptive loop filter with virtual boundary processing," JVET and ISO/IEC JTC 1/SC 29/WG 11, 14th meeting Geneva, JVET-N0088-v1 (Mar. 2019) (8 pages).

Chen, C., et al., "Description of Core Experiment 5 (CE5): Cross Component Adaptative Loop Filtering," JVET and ISO/IEC JTC 1/SC 29/WG 11, 16th meeting Geneva, JVET-P2025-v4 (Oct. 2019) (7 pages).

Misra, K., et al., "Cross-Component Adaptive Loop Filter for chroma," JVET and ISO/IEC JTC 1/SC 29/WG 11, 15th meeting Gothenburg, JVET-00636-r1 (Jul. 2019) (9 pages).

Hsu, C. et al., "CE10.2.1: Reducing one pixel line buffer by modified deblocking filter for horizontal LCU boundaries", Joint Collaborative Team on Video Coding (JCT-VC) of ITU-T SG16 WP3 and ISO/IEC JTC1/SC29/WG11, Document: JCTVC-H0280, 8th Meeting: San Jose, CA, USA, Feb. 1-10, 2012 (8 pages).

Chen, C. et al., "Non-CE8.c.7: Single-source SAO and ALF virtual boundary processing with cross9x9", Joint Collaborative Team on Video Coding (JCT-VC) of ITU-T SG16 WP3 and ISO/IEC JTC1/SC29/WG11, Document JCTVC-G212, 7th Meeting: Geneva, CH, Nov. 21-30, 2011 (25 pages).

Chen, J. et al., "Algorithm description for Versatile Video Coding and Test Model 7 (VTM 7)", Joint Video Experts Team (JVET) of ITU-T SG 16 WP3 and ISO/IEC JTC 1/SC 29/WG 11, Document: JVET-P2002-v1. 16th Meeting:, 1-Geneva, CH, Oct. 1-11, 2019 (90 pages).

Misra, K. et al., "CE5-Related: Reducing multiplier count in CCALF", Joint Video Experts Tam (JVET) of ITU-T SG 16 WP 3 and ISO/IEC JTC 1/SC 29/WG 11, Document: JVET-P0468-v3, 16th Meeting: Geneva, CH, Oct. 1-11, 2019 (5 pages).

* cited by examiner

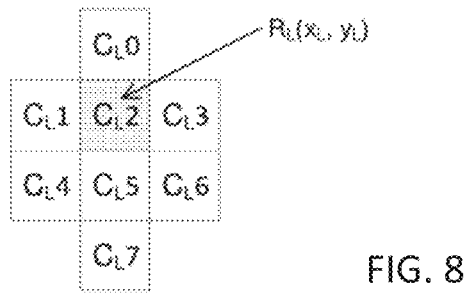
FIG. 8
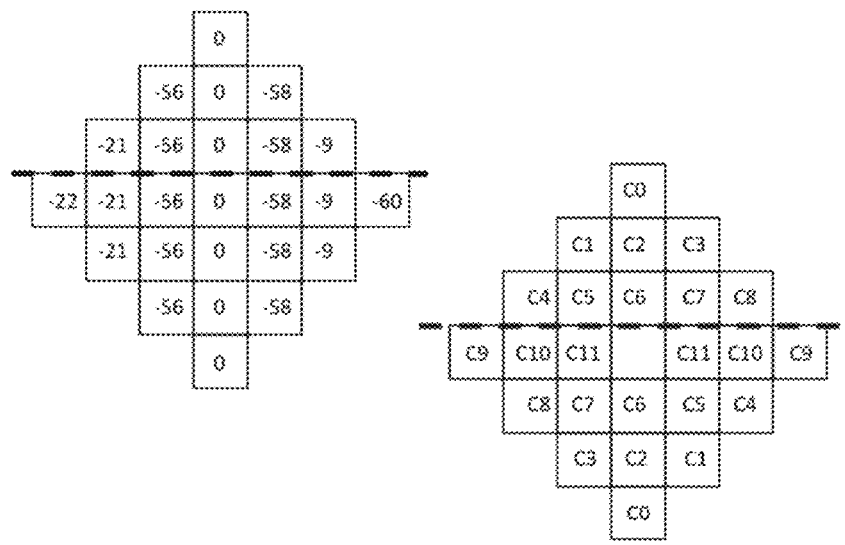
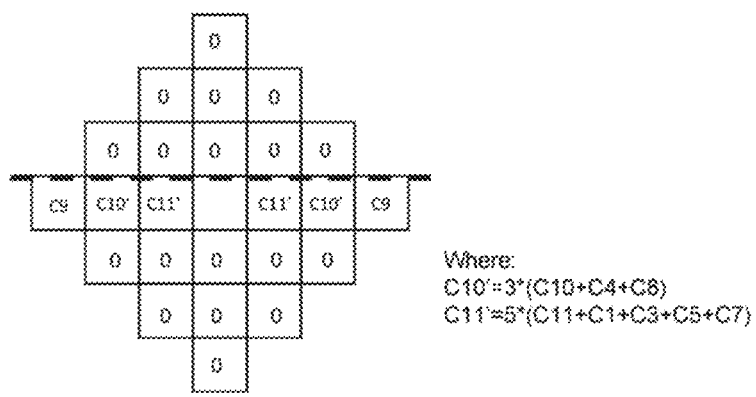
FIG. 9

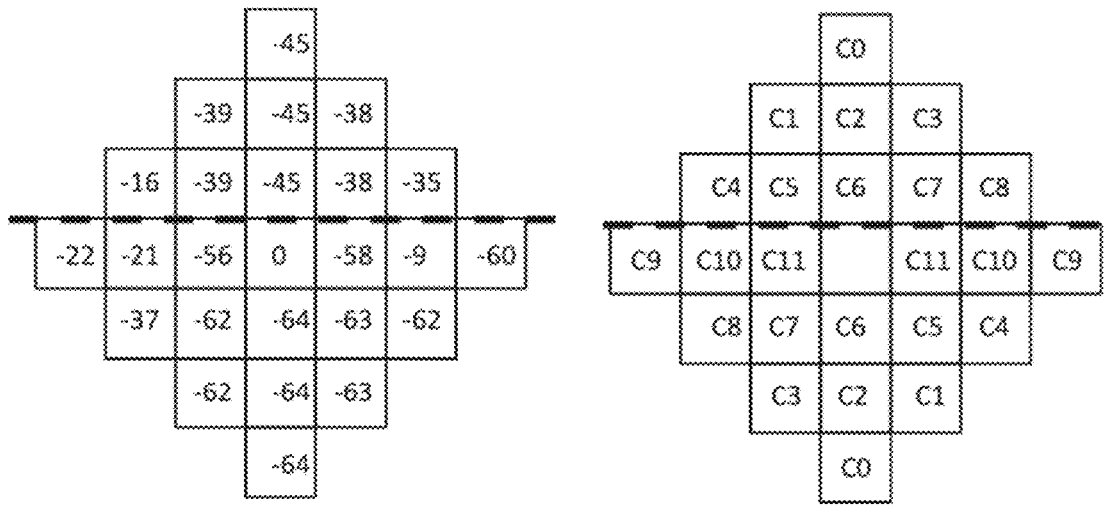
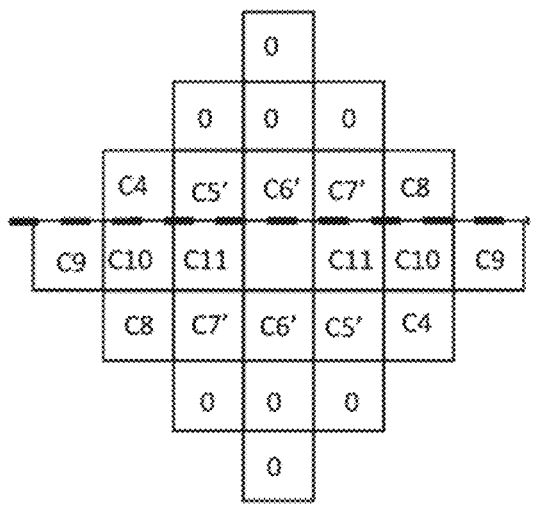
FIG. 17

VIRTUAL BOUNDARY PROCESSING FOR ADAPTIVE LOOP FILTERING

CROSS-REFERENCE TO RELATED APPLICATION

This application is a continuation of Ser. No. 17/724,883, filed on Apr. 20, 2022 (now U.S. Pat. No. 11,689,725 issued on Jun. 27, 2023), which is a continuation of Ser. No. 17/323,502, filed on May 18, 2021 (now U.S. Pat. No. 11,317,095 issued on Apr. 26, 2022), which is a continuation of International Application no. PCT/SE2020/051131, filed on Nov. 26, 2020, which claims priority to U.S. provisional patent application No. 62/953,310, filed on Dec. 24, 2019. The above identified applications and patents are incorporated by this reference.

TECHNICAL FIELD

This disclosure relates to encoding and decoding of images of a video sequence.

BACKGROUND

A video sequence consists of several images (also referred to herein as "pictures"). When viewed on a screen, the image consists of pixels, each pixel having a red, green and blue value (RGB). However, when encoding and decoding a video sequence, the image is often not represented using RGB but typically using another color space, including but not limited to YCbCr, $IC_TC_P$, non-constant-luminance YCbCr, and constant luminance YCbCr. If we take the example of YCbCr, it is made up of three components, Y, Cb and Cr. It is often the case that Y, which is called luma and which roughly represents luminance, is of full resolution, whereas the two other components, Cb and Cr, called chroma, are of a smaller resolution. A typical example is a high definition (HD) video sequence containing 1920×1080 RGB pixels, which is often represented with a 1920×1080-resolution Y component, a 960×540 Cb component and a 960×540 Cr component. The elements in the components are called samples. In the example given above, there are therefore 1920×1080 samples in the Y component, and hence a direct relationship between samples and pixels. Therefore, in this document, we sometimes use the term pixels and samples interchangeably. For the Cb and Cr components, there is no direct relationship between samples and pixels; a single Cb sample typically influences several pixels.

In the latest video coding standard, Versatile Video Coding standard (VVC), that is developed by the Joint Video Experts Team (JVET), the decoding of an image is carried out in two stages; prediction coding and loop filtering. In the prediction decoding stage, the samples of the components (Y, Cb and Cr) are partitioned into rectangular blocks. As an example, one block may be of size 4×8 samples, whereas another block may be of size 64×64 samples. The decoder obtains instructions for how to do a prediction for each block, for instance to copy samples from a previously decoded image (an example of temporal prediction), or copy samples from already decoded parts of the current image (an example of intra prediction), or a combination thereof. To improve this prediction, the decoder may obtain a residual, often encoded using transform coding such as discrete sine or cosine transform DST or DCT. This residual is added to the prediction, and the decoder can proceed to decode the following block.

The output from the prediction decoding stage is the three components Y, Cb and Cr. However, it is possible to further improve the fidelity of these components, and this is done in the loop filtering stage. The loop filtering stage in VVC consists of three sub-stages; a deblocking filter stage, a sample adaptive offset filter (SAO) sub-stage, and an adaptive loop filter (ALF) sub-stage. In the deblocking filter sub-stage, the decoder changes Y, Cb and Cr by smoothing edges near block boundaries when certain conditions are met. This increases perceptual quality (subjective quality) since the human visual system is very good at detecting regular edges such as block artifacts along block boundaries. In the SAO sub-stage, the decoder adds or subtracts a signaled value to samples that meet certain conditions, such as being in a certain value range (band offset SAO) or having a specific neighborhood (edge offset SAO). This can reduce ringing noise since such noise often aggregate in certain value range or in specific neighborhoods (e.g., in local maxima). In this document we will denote the reconstructed image component that are the result of this stage $Y_{SAO}$, $Cb_{SAO}$, $Cr_{SAO}$. The loop filter stage does not have to wait until all blocks of the three components have been reconstructed but can proceed block by block if desired.

This invention relates to the third sub-stage, ALF, and therefore we will describe that in a bit more detail. The basic idea behind adaptive loop filtering is that the fidelity of the image components $Y_{SAO}$, $Cb_{SAO}$ and $Cr_{SAO}$ can often be improved by filtering the image using a linear filter that is signaled from the encoder to the decoder. As an example, by solving a least-squares problem, the encoder can determine what coefficients a linear filter should have in order to most efficiently lower the error between the reconstructed image components so far, $Y_{SAO}$, $Cb_{SAO}$, $Cr_{SAO}$, and the original image components $Y_{org}$, $Cb_{org}$ and $Cr_{org}$. These coefficients can then be signaled from the encoder to the decoder. The decoder reconstructs the image as described above to get $Y_{SAO}$, $Cb_{SAO}$, and $Cr_{SAO}$, obtains the filter coefficients from the bitstream and then applies the filter to get the final output, which we will denote $Y_{ALF}$, $Cb_{ALF}$, $Cr_{ALF}$.

In VVC, the ALF luma filter is more advanced than this. To start with, it is observed that it is often advantageous to filter some samples with one set of coefficients, but avoid filtering other samples, or perhaps filter those other samples with another set of coefficients. To that end, VVC classifies every Y sample (i.e., every luma sample) into one of 25 classes. Which class a sample belongs to is decided for each 4×4 block based on the local neighborhood of that sample (8×8 neighborhood), specifically on the gradients of surrounding samples and the activity of surrounding samples. As can be seen from the VVC specification four variables are computed to determine the characteristics of the local neighborhood of the current sample where filtH measures gradient horizontally, filtV measures gradients vertically, filtD0 measure gradients diagonally top left to bottom right and filtD1 measures gradients diagonally top right to bottom left:

$$\text{filtH}[i][j] = \text{Abs}((\text{recPicture}[h_{x4+i}, v_{y4+j}] << 1) - \text{recPicture}[h_{x4+i-1}, v_{y4+j}] - \text{recPicture}[h_{x4+i+1}, v_{y4+j}]) \quad (1429)$$

$$\text{filtV}[i][j] = \text{Abs}((\text{recPicture}[h_{x4+i}, v_{y4+j}] << 1) - \text{recPicture}[h_{x4+i}, v_{y4+j-1}] - \text{recPicture}[h_{x4+i}, v_{y4+j+1}]) \quad (1430)$$

$$\text{filtD0}[i][j] = \text{Abs}((\text{recPicture}[h_{x4+i}, v_{y4+j}] << 1) - \text{recPicture}[h_{x4+i-1}, v_{y4+j-1}] - \text{recPicture}[h_{x4+i+1}, v_{y4+j+1}]) \quad (1431)$$

-continued $$\text{filtD1}[i][j] = \text{Abs}((\text{recPicture}[h_{x4+i}, v_{y4+j}] << 1) - \text{recPicture}[h_{x4+i+1}, v_{y4+j-1}] - \text{recPicture}[h_{x4+i-1}, v_{y4+j+1}]) \quad (1432)$$

Then these variables are summed up in a local neighborhood around the current sample to get a more reliable estimate of the directionality of the neighborhood as follows where sumH indicates the sum of filtH, sumV the sum of filtV, sumD0 the sum of filtD0, sumD1 the sum of filtD1 and sumOfHV the sum of sumV and sumV from VVC draft below:

The variables sumH[x][y], sumV[x][y], sumD0[x][y], sumD1[x][y] and sumOfHV[x][y] are derived as follows:
$$\text{sumH}[x][y] = \Sigma_i \Sigma_j \text{ filtH}[i][j], \quad (1433)$$
with i = − 2..5, j = minY..maxY
$$\text{sumV}[x][y] = \Sigma_i \Sigma_j \text{ filtV}[i][j], \quad (1434)$$
with i = − 2..5, j = minY..maxY
$$\text{sumD0}[x][y] = \Sigma_i \Sigma_j \text{ filtD0}[i][j], \quad (1435)$$
with i = − 2..5, j = minY..maxY
$$\text{sumD1}[x][y] = \Sigma_i \Sigma_j \text{ filtD1}[i][j], \quad (1436)$$
with i = − 2..5, j = minY..maxY
$$\text{sumOfHV}[x][y] = \text{sumH}[x][y] + \text{sumV}[x][y] \quad (1437)$$

Finally based on these metrics a classification is made to determine which set of filters filtIdx to use for the current sample and also a transposeIdx such that several directionalities can share the same filter coefficients, from VVC draft below:

From above it can be seen that filtIdx equal to 0 to 4 do not have any specific directional characteristics. A value of filterIdx greater than 4 corresponds to directionality of the samples, since this means that dirS is greater than 0. Studying the addition to filtIdx, $$i \cdot \text{filtIdx}[x][y] += (((\text{dir1}[x][y] \& 0 \times 1) << 1) + \text{dirS}[x][y]) * 5,$$

we see that if we have a diagonal directionality, i.e., if dir1 is either 0 or 2, the first term will be zero and we can add either 1*5 (if dirS=1) or 2*5 (if dirS=2). (If dirS=0 we will not do the addition.) Hence all values of filterIdx from 5 to 14 correspond to a diagonal directionality of the samples. Likewise, if we have a horizontal or vertical directionality, i.e., if dir1 is either 1 or 3, then the first term (dir1 & 1)<<1 will become 2. Therefore, in this case, we will either add (2+1)*5 (if dirS=1) or we will add (2+2)*5 (if dirS=2) resulting in values between 15 and 24. Hence we have concluded that filtIdx indicates the directionality of the surrounding samples in the following way as described in Table 1:

TABLE 1

The value filtIdx indicates directionality in the following way

| filtIdx range | Directionality |
| --- | --- |
| 0 . . . 4 | No directionality |
| 5 . . . 14 | Diagnoal directionality (dir1 = 0 or 2) |
| 15 . . . 24 | Horizontal or vertical directionality (dir1 = 1 or 3) |

The classification filter index array filtIdx and transpose index array transposeIdx are derived by the following steps:
The variables dir1[x][y], dir2[x][y] and dirS[x][y] with x, y = 0..CtbSize Y − 1 are derived as follows:
The variables hv1, hv0 and dirHV are derived as follows:
If sumV[x >> 2][y >> 2] is greater than sumH[x >> 2][y >> 2], the following applies:
hv1 = sumV[x >> 2][y >> 2]  (1438)
hv0 = sumH[x >> 2][y >> 2]  (1439)
dirHV = 1  (1440)
Otherwise, the following applies:
hv1 = sumH[x >> 2][y >> 2]  (1441)
hv0 = sumV[x >> 2][y >> 2]  (1442)
dirHV = 3  (1443)
The variables d1, d0 and dirD are derived as follows:
If sumD0[x >> 2][y >> 2] is greater than sumD1[x >> 2][y >> 2], the following applies:
d1 = sumD0[x >> 2][y >> 2]  (1444)
d0 = sumD1[x >> 2][y >> 2]  (1445)
dirD = 0  (1446)
Otherwise, the following applies:
d1 = sumD1[x >> 2][y >> 2]  (1447)
d0 = sumD0[x >> 2][y >> 2]  (1448)
dirD = 2  (1449)
The variables hvd1, hvd0, are derived as follows:
hvd1 = (d1 * hv0 > hv1 * d0) ? d1 : hv1  (1450)
hvd0 = (d1 * hv0 > hv1 * d0) ? d0 : hv0  (1451)
The variables dirS[x][y], dir1[x][y] and dir2[x][y] derived as follows:
dir1[x][y] = (d1 * hv0 > hv1 * d0) ? dirD : dirHV  (1452)
dir2[x][y] = (d1 * hv0 > hv1 * d0) ? dirHV : dirD  (1453)
dirS[x][y] = (hvd1 *2 > 9 * hvd0) ? 2 : ((hvd1 > 2 * hvd0) ? 1 : 0)  (1454)
The variable avgVar[x][y] with x, y = 0..CtbSizeY − 1 is derived as follows:
varTab[ ] = { 0, 1, 2, 2, 2, 2, 2, 3, 3, 3, 3, 3, 3, 3, 3, 4 }  (1455)
avgVar[x][y] = varTab[Clip3(0, 15,  (1456)
 (sumOfHV[x >> 2][y >> 2] * ac[x >> 2][y >> 2]) >> (4 + BitDepth))]
The classification filter index array filtIdx[x][y] and the transpose index array transposeIdx[x][y] with x = y = 0..CtbSizeY − 1 are derived as follows:
transposeTable[ ] = { 0, 1, 0, 2, 2, 3, 1, 3 }
transposeIdx[x][y] = transposeTable[dir1[x][y] * 2 + (dir2[x][y] >> 1)]
filtIdx[x][y] = avgVar[x][y]
When dirS[x][y] is not equal 0, filtIdx[x][y] is modified as follows:
filtIdx[x][y] += (((dir1[x][y] & 0x1) << 1) + dirS[x][y]) * 5  (1457)

Where transposeIdx equal to 0 corresponds to no transpose of the filter coefficients, transposeIdx equal to 1 corresponds to mirror the filter coefficients along the diagonal from top right to bottom left, transposeIdx equal to 2 corresponds to mirror the filter coefficients along the vertical axis and transposeIdx equal to 3 corresponds to rotating the filter coefficients 90 degrees.

This means that when the filterIdx is between 15 and 24 and transposeIdx is equal to 3 the local structure around the current sample has a vertical directionality and when transposeIdx is equal to 0 the local structure around the current sample has a horizontal directionality.

It is possible for the encoder to signal one set of coefficients for each of the 25 classes. In VVC the ALF coefficients etc., are signaled in adaptive parameter sets (APS) that then can be referred by an aps index that determines which of the defined sets to use to when decoding pictures. The decoder will then first decide which class a sample belongs to, and then select the appropriate set of coefficients to filter the sample. However, signaling 25 sets of coefficients can be costly. Hence the VVC standard also allows that only a few of the 25 classes are filtered using unique sets of coefficients. The remaining classes may reuse a set of coefficients used in another class, or it may be determined that it should not be filtered at all. Another way to reduce cost is to use what is called the fixed coefficient set. This is a set of 64 hard-coded filters (i.e., 64 groups of coefficient values) that are known to the decoder. It is possible for the encoder to signal the use of one of these fixed (i.e., hard-coded) filters to the decoder very inexpensively, since they are already known to the decoder. For example, the decoder stores a set of 16 different groups of N index values (e.g., N=25) and the encoder transmits an initial index value that points to one of the 16 groups of N index values, where each one of the index values included in the group of N index values is associated with a class and each one of the index values points to one of the 64 hard-coded filters. For example, the first of the N values in the group of index values points to the fixed filter that should be used for the first class, the second value points to the fixed filter that should be used for the second class, etc. Accordingly, the decoder obtains an index value for a particular filter based on the initial index value and the class. Although these filters are cheap, they may not match the desired filter perfectly and may thus result in slightly worse quality. For samples belonging to Cb or Cr, i.e., for chroma samples, no classification is used and the same set of coefficients is used for all samples.

Transmitting the filter coefficients is costly, and therefore the same coefficient value is used for two filter positions. For luma (samples in the Y-component), the coefficients are re-used in the way shown in FIG. 1. As shown in FIG. 1, each coefficient is used twice in the filter, and FIG. 1 shows the spatial neighborhood the luma filter covers (i.e., FIG. 1 shows the other sample values that are used to filter the value of the current sample (i.e., the sample value in the center of neighborhood) and its configuration with regards to filter coefficients for luma. It can be seen that the filter coverage is symmetric and covers up to 3 samples away from the center both horizontally and vertically.

Assume R(x,y) is the sample to be filtered, situated in the middle of the FIG. 1. Then samples R(x,y−1) (the sample exactly above) and the sample R(x,y+1) (the sample exactly below) will be treated with the same coefficient C6.

The filtered version of the reconstructed sample in position (x, y), which we will denote $R_F(x, y)$, is calculated in the following way from VVC specification equation 1411 to 1426 and Table 43, where $(x,y)=(h_x, v_y)$ and C0=f[idx[0]], C1=f[idx[1]], C2=f[idx[2]], C3=f[idx[3]], C4=f[idx[4]], C5=f[idx[5]], C6=f[idx[6]], C7=f[idx[7]], C8=f[idx[8]], C9=f[idx[9]], C10=f[idx[10]] and C11=f[idx[11]]:

TABLE 43

Specification of y1, y2, and y3 according to the vertical luma sample position y and applyAlfLineBufBoundary The array of luma filter coefficients f[j] and the array of luma clipping values c[j] corresponding to the filter specified by filtIdx[x][y] is derived as follows with j = 0..11:
If AlfCtbFiltSetIdxY[xCtb >> CtbLog2SizeY][yCtb >> CtbLog2SizeY] is less than 16, the following applies:
i = AlfCtbFiltSetIdxY[xCtb >> CtbLog2SizeY][yCtb >> CtbLog2SizeY]  (1411)
f[j] = AlfFixFiltCoeff[AlfClassToFiltMap[i][filtIdx[x][y]]][j]  (1412)
c[j] = $2^{BitDepth}$  (1413)
Otherwise (AlfCtbFiltSetIdxY[xCtb >> CtbLog2SizeY][yCtb >> CtbLog2SizeY] is greater than or equal to 16, the following applies:
i = slice_alf_aps_id_luma[AlfCtbFiltSetIdxY[xCtb >> CtbLog2SizeY][yCtb >> CtbLog2SizeY] − 16]  (1414)
f[j] = AlfCoeff$_L$[i][ filtIdx[x][y]][j]  (1415)
c[j] = AlfClip$_L$[i][filtIdx[x][y]][j]  (1416)
The luma filter coefficients and clipping values index idx are derived depending on transposeIdx[x][y] as follows:
If transposeIndex[x][y] is equal to 1, the following applies:
idx[ ] = { 9, 4, 10, 8, 1, 5, 11, 7, 3, 0, 2, 6 }  (1417)
Otherwise, if transposeIndex[x][y] is equal to 2, the following applies:
idx[ ] = { 0, 3, 2, 1, 8, 7, 6, 5, 4, 9, 10, 11 }  (1418)
Otherwise, if transposeIndex[x][y] is equal to 3, the following applies:
idx[ ] = { 9, 8, 10, 4, 3, 7, 11, 5, 1, 0, 2, 6 }  (1419)
Otherwise, the following applies:
idx[ ] = { 0, 1, 2, 3, 4, 5, 6, 7, 8, 9, 10, 11 }  (1420)
The locations ( $h_{x+i}$, $v_{y+j}$ ) for each of the corresponding luma samples ( x, y ) inside the given array recPicture of luma samples with i, j = −3..3 are derived as follows:
$h_{x+i}$ = Clip3( 0, pic_width_in_luma_samples − 1, xCtb + x + i )  (1421)
$v_{y+j}$ = Clip3( 0, pic_height_in_luma_samples − 1, yCtb + y + j )  (1422)
The variables clipLeftPos, clipRightPos, clipTopPos, clipBottomPos, clipTopLeftFlag and clipBotRightFlag are derived by invoking the ALF boundary position derivation process as specified in clause 8.8.5.5 with ( xCtb, yCtb ) and ( x, y ) as inputs.

TABLE 43-continued

Specification of y1, y2, and y3 according to the vertical
luma sample position y and applyAlfLineBufBoundary The variables hx + i and vy + j are modified by invoking the ALF sample padding process as
specified in clause 8.8.5.6 with ( xCtb, yCtb ), (hx + i, vy + j), 0, clipLeftPos, clipRightPos,
clipTopPos, clipBottomPos, clipTopLeftFlag and clipBotRightFlag as input.
The variable applyAlfLineBufBoundary is derived as follows:
If the bottom boundary of the current coding tree block is the bottom boundary of current
picture and pic_height_in_luma_samples − yCtb <= CtbSize Y − 4, applyAlfLineBufBoundary
is set equal to 0:
Otherwise, applyAlfLineBufBoundary is set equal to 1.
The vertical sample position offsets y1, y2 and y3 are specified in Table 43 according to the
vertical luma sample position y and applyAlfLineBufBoundary.

curr = recPicture$_L$[h$_x$, v$_y$]  (1423)

sum = f[idx[0]] * (Clip3(−c[idx[0]], c[idx[0]], recPicture$_L$[h$_x$, v$_{y + y3}$] − curr) +
  Clip3(−c[idx[0]], c[idx[0]], recPicture$_L$[h$_x$, v$_{y − y3}$] − curr)) +
f[idx[1]] * (Clip3(−c[idx[1]], c[idx[1]], recPicture$_L$[h$_{x + 1}$, v$_{y + y2}$] − curr) +
  Clip3(−c[idx[1]], c[idx[1]], recPicture$_L$[h$_{x − 1}$, v$_{y − y2}$] − curr)) +
f[idx [2]] * (Clip3(−c[idx[2]], c[idx[2]], recPicture$_L$[h$_x$, v$_{y + y2}$] − curr) +
  Clip3(−c[idx[2]], c[idx[2]], recPicture$_L$[h$_x$, v$_{y − y2}$] − curr)) +
f[idx[3]] * (Clip3(−c[idx[3]], c[idx[3]], recPicture$_L$[h$_{x − 1}$, v$_{y + y2}$] − curr) +
  Clip3(−c[idx[3]], c[idx[3]], recPicture$_L$[h$_{x + 1}$, v$_{y − y2}$] − curr)) +
f[idx[4]] * (Clip3(−c[idx[4]], c[idx[4]], recPicture$_L$[h$_{x + 2}$, v$_{y + y1}$] − curr) +
  Clip3(−c[idx[4]], c[idx[4]], recPicture$_L$[h$_{x − 2}$, v$_{y − y1}$] − curr)) +
f[idx [5]] * (Clip3(−c[idx[5]], c[idx[5]], recPicture$_L$[h$_{x + 1}$, v$_{y + y1}$] − curr) +
  Clip3(−c[idx[5]], c[idx[5]], recPicture$_L$[h$_{x − 1}$, v$_{y − y1}$] − curr)) +
f[idx [6]] * (Clip3(−c[idx[6]], c[idx[6]], recPicture$_L$[h$_x$, v$_{y + y1}$] − curr) +
  Clip3(−c[idx[6]], c[idx[6]], recPicture$_L$[h$_x$, v$_{y − y1}$] − curr)) +
f[idx [7]] * (Clip3(−c[idx[7]], c[idx[7]], recPicture$_L$[h$_{x − 1}$, v$_{y + y1}$] − curr) +
  Clip3(−c[idx[7]], c[idx[7]], recPicture$_L$[h$_{x + 1}$, v$_{y − y1}$] − curr)) +
f[idx [8]] * (Clip3(−c[idx[8]], c[idx[8]], recPicture$_L$[h$_{x − 2}$, v$_{y + y1}$] − curr) +
  Clip3(−c[idx[8], c[idx[8], recPicture$_L$[h$_{x + 2}$, v$_{y − y1}$] − curr) +
f[idx [9]] * (Clip3(−c[idx[9]], c[idx[9]], recPicture$_L$[h$_{x + 3}$, v$_y$] − curr) +
  Clip3(−c[idx[9]], c[idx[9]], recPicture$_L$[h$_{x − 3}$, v$_y$] − curr)) +
f[idx [10]] * (Clip3(−c[idx[10]], c[idx[10]], recPicture$_L$[h$_{x + 2}$, v$_y$] − curr) +
  Clip3(−c[idx[10]], c[idx[10]], recPicture$_L$[h$_{x − 2}$, v$_y$] − curr)) +
f[idx [11]] * (Clip3(−c[idx[11]], c[idx[11]], recPicture$_L$[h$_{x + 1}$, v$_y$] − curr) +
  Clip3(−c[idx[11]], c[idx[11]], recPicture$_L$[h$_{x − 1}$, v$_y$] − curr)).  (1424)

sum = curr + ((sum + 64) >> 7)  (1425)

The modified filtered reconstructed luma picture sample alfPicture$_L$[xCtb + x][yCtb + y] is
derived as follows:
alfPicture$_L$[xCtb + x][yCtb + y] = Clip3(0, (1 << BitDepth) − 1, sum)  (1426)

| Condition | y1 | y2 | y3 |
|---|---|---|---|
| (y = = CtbSizeY − 5 ‖ y = = CtbSizeY − 4) && (applyAlfLineBufBoundary = = 1) | 0 | 0 | 0 |
| (y = = CtbSizeY − 6 ‖ y = = CtbSizeY − 3) && (applyAlfLineBufBoundary = = 1) | 1 | 1 | 1 |
| (y = = CtbSizeY − 7 ‖ y = = CtbSizeY − 2) && (applyAlfLineBufBoundary = = 1) | 1 | 2 | 2 |
| Otherwise | 1 | 2 | 3 |

CtbSizeY is the vertical size of a coding tree unit (CTU). CTU in VVC is typically 128×128. Here the Clip3(x, y, z) operation simply makes sure that the magnitude of the value z never exceeds y or goes below x:

$$\text{Clip3}(x, y, z) = \begin{cases} x; & z < x \\ y; & z > y \\ z; & \text{otherwise} \end{cases}$$

The clipping parameters "c[x]" are also to be signaled from the encoder to the decoder.

Decoding an image is done in sequential CTU order. As an example, if the video frame has 512×256 samples, it can consist of two rows of 128×128 CTUs where each row will have four CTUs. When decoding the second row of CTUs, it is sometimes required that the decoder accesses samples from the preceding (first) CTU row. In a practical hardware decoder, this is most often solved by saving the bottom-most lines of samples in what is called a line buffer, from where it can be accessed easily. Continuing on with our example, if we need to access two samples above the current sample, we must store two lines of samples in our line buffer, in this case 512×2 samples. However, line buffers are expensive in terms of silicon surface area. Therefore, in many parts of the VVC standard, reading outside the CTU is prohibited or restricted, so that there is less of a need for expensive line buffers.

Before the concept of "virtual horizontal CTU boundary" was introduced the line buffer requirement for ALF was 6 additional lines (rows) as can be seen in FIG. 13 where ALF filtering of the above CTU only can be performed with the filter covering only samples above row 4 from the bottom of the above CTU as shown in position 106. When deblocking and SAO has been performed ALF in position 105 and below rows can be performed.

One attempt to reduce the need for horizontal CTU line buffer requirements for ALF is the concept of a "virtual horizontal CTU boundary" which is used in VVC. The position of the virtual horizontal boundary is four samples above the border between the current CTU and the CTU directly above the current CTU (i.e., the "above" CTU), as can be seen in FIG. 2, which shows the position of the virtual boundary and two possible ALF filterings. The virtual boundary is situated here because of how deblocking works: when deblocking samples that are at the CTU boundary, the deblocking process can read up to four samples above the CTU boundary. This means that samples below the virtual boundary cannot be deblocked in the above CTU until the current CTU has been decoded—the last four lines are dependent on the sample values in the current CTU.

After the samples below the virtual boundary in the above CTU have been deblocked, they must be processed by SAO and ALF. Assume for simplicity that SAO is disabled and that only ALF processing needs to be carried out. If no consideration to the virtual boundary was taken when doing ALF filtering, then some samples above the virtual boundary would be accessed. This can be seen in FIG. 2 when the filter is in position 101—three rows of samples above the virtual boundary are accessed. This would mean that 3 extra lines of linebuffer would be necessary, which is costly. To avoid this, it is specified that when ALF filtering occurs at or below the virtual horizontal CTU boundary, no sample above the virtual boundary samples are used (e.g., the spatial coverage of the filter is reduced). Similarly, when filtering above the virtual horizontal CTU boundary no sample at the virtual horizontal CTU boundary or below is used. This is accomplished by using what is called symmetric padding. Symmetric padding can be described as follows. When the center of the filter is at the virtual horizontal CTU boundary or at the row above the virtual CTU boundary the neighboring rows are padded by the row centered at the filter, this corresponds to padding parameters y1=y2=y3=0 as defined in Table 43 in VVC specification. In FIG. 3 we have shown an example where the virtual boundary is right above the center sample. In this case, symmetric padding will mean that the samples as shown to the left will be filtered as if the sample values were as is shown to the right.

When the center row is two rows above the virtual boundary the rows at or below the virtual boundary are padded by the row adjacent and below the center row, the rows above the row adjacent and above the center row are padded by the row above the center row, this corresponds to padding parameters y1=y2=y3=1 as defined in Table 43 in VVC specification. FIG. 4 shows an example where the virtual boundary is one step removed from the filter center, and the samples to the left will then be filtered as if they were the values shown to the right. This effectively means that the spatial coverage of the filter is reduced to only become a horizontal filter.

When the center row is three rows above the virtual boundary the rows at the virtual or below the virtual boundary are padded by the row two rows below the center row. The rows more than two rows above the center row are padded by row two rows above the center row, this corresponds to padding parameters y1=1 and y2=2 and y3=2 in Table 43 in the VVC specification. FIG. 5 shows an example of filtering when filter support just crosses the virtual boundary, where the samples to the left are filtered as if they were the values to the right.

The symmetric padding approach is also used for filtering of rows below the virtual boundary. For the determination of the classification the regions used for classification is restricted to avoid including samples on the other side of the virtual boundary and in addition to that the adjacent row on the other side of the virtual boundary is padded based on the row on the row the current side.

Symmetric padding also applies for ALF filtering of chroma components to avoid increasing the number of line buffers for chroma. For chroma the position of the virtual boundary is on row two from the bottom of above CTU since that is the last row that is used for chroma deblocking of a horizontal chroma CTU boundary.

Besides the concept of virtual horizontal CTU boundaries as shown above virtual boundaries in VVC can also be defined at horizontal positions which are a multiple of 8 and vertical positions that are a multiple of 8. For such boundaries padding is only used on the side of the filter which has any filter coefficient on the another side of the virtual boundary than the position of the center sample of the filter, e.g. current sample, such that the sample adjacent to the boundary on same side as the current sample is used instead of a sample on the other side of the virtual boundary. The symmetry padding described for virtual horizontal CTU boundaries could be seen as a double sided padded where defined virtual boundaries use single sided padding.

sps_virtual_boundaries_present_flag equal to 1 specifies that information of virtual boundaries is signalled in the SPS. sps_virtual_boundaries_present_flag equal to 0 specifies that information of virtual boundaries is not signalled in the SPS. When there is one or more than one virtual boundary signalled in the SPS, the in-loop filtering operations are disabled across the virtual boundaries in pictures referring to the SPS. In-loop filtering operations include the deblocking filter, sample adaptive offset filter, and adaptive loop filter operations ph_virtual_boundaries_present_flag equal to 1 specifies that information of virtual boundaries is signalled in the PH. ph_virtual_boundaries_present_flag equal to 0 specifies that information of virtual boundaries is not signalled in the PH. When there is one or more than one virtual boundary signalled in the PH, the in-loop filtering operations are disabled across the virtual boundaries in the picture. The in-loop filtering operations include the deblocking filter, sample adaptive offset filter, and adaptive loop filter operations. When not present, the value of ph_virtual_boundaries_present_flag is inferred to be equal to 0.

In JVET-O0636 [1], a tool called the Cross-Component Adaptive Loop Filter (CC-ALF) was first proposed as part of the adaptive loop filter process. The CC-ALF was studied in a Core Experiment in JVET-P meeting and JVET-Q meeting. The CC-ALF makes use of luma sample values to refine each chroma component. The luma sample values were reconstructed luma samples after SAO and before luma ALF operations. A linear, diamond shaped filter is applied to the luma samples for each chroma component i to derive a residual correction $\Delta I_i(x, y)$. The residual correction is applied to the reconstructed chroma sample after ALF chroma to derive the reconstructed chroma sample value. FIG. 6 illustrates the placement of CC-ALF with respect to other loop filters.

In JVET-P2025 [2], description of Core experiment 5 (CE5): Cross component Adaptive Loop filtering, the CC-ALF specifies an anchor CC-ALF (name as "CE anchor" in the following of the current invention) for core experiment test, which includes the following properties: 1) Filter shape is a 3×4 diamond with 8 unique coefficients; 2) Filter coefficient dynamic range between [−32, 31], inclusive; 3) Filter selection to performed at the CTU level with support for a maximum of 4 filters; 4) Symmetric line selection is used at virtual boundary; 5) Temporal layer coefficient buffers are not used; and 6) Residual correction is clipped to $-2^{BitDepthC-1}$ to $2^{BitDepthC-1}-1$, inclusive.

The CE anchor applies an 8-tap diamond CC-ALF filter to the co-located luma samples centered at the chroma sample to be refined. FIG. 7 shows the CE anchor CC-ALF filter shape.

Assume the $R_C(x_C, y_C)$ is the ALF chroma reconstructed chroma sample to be refined by CC-ALF, where the $(x_C, y_C)$ specifies the position of the chroma sample in the current picture. The co-located luma sample to the $R_C(x_C, y_C)$ is $R_L(x_L, y_L)$, where $(x_L, y_L)$ specifies the position i of the co-located luma sample in the current picture. The 8 luma samples to be filtered by CC-ALF are $R_L(x_L-1, y_L)$, $R_L(x_L, y_L-1)$, $R_L(x_L, y_L)$, $R_L(x_L-1, y_L+1)$, $R_L(x_L+1, y_L-1)$, $R_L(x_L+1, y_L)$, $R_L(x_L+1, y_L+1)$, $R_L(x_L+2, y_L)$. FIG. 8 shows the 8-tap 3×4 diamond CC-ALF filter coefficient respect to the luma sample location.

The residual correction $\Delta l_i(x, y)$ is calculated in the following way:

$$\Delta l_i(x,y)=(C_L0*R_L(x_L-1,y_L)+C_L1*R_L(x_L,y_L-1)+C_L2*R_L(x_L,y_L)+C_L3*R_L(x_L,y_L+1)+C_L4*R_L(x_L+1,y_L-1)+C_L5*R_L(x_L+1,y_L)+C_L6*R_L(x_L+1,y_L+1)+C_L7*R_L(x_L+2,y_L)+2^{shiftFactor-1}) >> shitFactor \quad \text{(Eqn 4)}$$

where, $C_Li$ specifies the CC-ALF filter coefficients, i ranges from 0 to 7, each coefficient but $C_L2$ is trained in the encoder side.

The CC-ALF filter coefficient $C_Li$ has a value ranges between [−32, 31], inclusive. This value range is also known as dynamic range.

$C_L2=(-1)*(C_L0+C_L1+C_L3++C_L5+C_L6+C_L7)$ with clip to a value ranges between [−32, 31], inclusive.

shiftFactor=coefficient bit scale+(BitDepth$_Y$−BitDepth$_C$), where in CE anchor, coefficient bit scale is equal to 7.

The residual correction $\Delta l_i(x, y)$ is clipped to a value range between [$-2^{BitDepthC-1}$, $2^{BitDepthC-1}-1$], inclusive. The CC-ALF refined chroma sample $R_F(x_C, y_C)$ is then derived as: $R_F(x_C, y_C)=\Delta l_i(x, y)+R_C(x_C, y_C)$, with clip to a value range between [0, $2^{BitDepthC}-1$], inclusive.

The CC-ALF filter coefficient is coded with 6 bits fix length code which can represent value ranges from 0 to 63. The encoded/decoded CC-ALF coefficient names as $D_L(i)$, which i ranges from 0,1,2 to 7. The CC-ALF coefficient $C_L(i)$ is equal to $D_L(i)$ −32.

Similar to ALF, CC-ALF also use virtual boundary processing by means of symmetric padding for the filtering of luma samples to avoid increasing the line buffer requirements for luma.

SUMMARY

Certain challenges presently exist. It was observed that the ALF virtual boundary processing can generate visual artifacts. The artifacts are most prominent at the virtual horizontal CTU boundaries and the row above the virtual horizontal CTU boundary. The reason for artifacts is due to the padding, which effectively reduces the spatial coverage of the filter—i.e., the number of samples used for the filtering is reduced compared to the samples that were used during the determining of the filter coefficients, as is shown in FIG. 3 through FIG. 5. Because padding affects the samples most when filtering samples close to the virtual boundary (e.g., such as in FIG. 3) compared to further away from the boundary (e.g., such as in FIG. 5) the artifacts become largest there.

If we consider the horizontal virtual boundary, the ALF filter support due to the padding will only be horizontal. This can be seen in FIG. 9. In the top left diagram, we have subtracted the middle sample (120) from all the values in FIG. 3. These values are then multiplied by the coefficients shown in the top right diagram of FIG. 9. However, this is the same thing as using zeros everywhere except in the middle row, as is shown in the right most diagram of FIG. 9. Accordingly, FIG. 9 illustrates that when using padded sample differentials (top left), the filter (top right) becomes just a horizontal filter (bottom).

The contribution to the filtering from the samples horizontally adjacent to the center sample will be 5 times the intended difference between the center (at position of C12 in FIG. 1) and the closest adjacent sample (at position of C11 in FIG. 1), and 3 times the intended difference between the center sample (at position of C12 in FIG. 1) and the adjacent samples at distance two from the center sample (at positions of C10 in FIG. 1). Furthermore, the filter coefficient for respective adjacent sample will be equal to the sum of the coefficients vertically aligned with the adjacent sample, e.g. at position of C11 the coefficient will be C11+C1+C3+C5+C7, etc.

This disclosure presents alternatives to remove the visual artifacts from filtering at virtual boundaries. One alternative is to omit filtering at the virtual boundary and the row above the virtual boundary, e.g., when the spatial coverage of the filter is reduced significantly compared to the intended spatial coverage to avoid using samples on the other side of the virtual boundary when filtering on one side of the virtual boundary, effectively only having a filter with horizontal spatial coverage.

Another alternative is to reduce the amount of change of the current sample from the filtering to reflect modification of the filter due to the padding near virtual boundaries, e.g., when the spatial coverage of the filter is reduced significantly compared to the intended spatial coverage to avoid using samples on the other side of the virtual boundary when filtering on one side of the virtual boundary, effectively only having a filter with horizontal spatial coverage.

Another alternative is to restrict the amount of reduction of the spatial coverage of the filter such that the spatial coverage of the filter at least includes neighboring samples at a distance of 1 from the center sample vertically and horizontally.

Each alternative provides the advantage of removing artifacts that the virtual boundary processing for ALF in VVC can introduce. The second alternative also maintains some benefit of filtering also for virtual boundaries by reducing the filtering strength e.g., the amount of change of the current sample value from filtering at virtual boundaries.

Accordingly, according to a first aspect of the present disclosure there is provided a method for encoding or decoding an image of a video sequence. The method comprises obtaining a set of sample values associated with the image, the set of sample values comprising a current sample value and sample values neighboring the current sample value, wherein the obtained set of sample values is included within a first rectangular block of sample values set of sample values comprises a current sample value and sample values neighboring the current sample value. The method further comprises determining a relative location of the current sample value with respect to a virtual boundary. The virtual boundary is defined with respect to a block boundary between the first block of sample values and a second block of sample values. The virtual boundary is parallel with the block boundary and separated from the block boundary by at least one row or column of sample values included in the first block of sample values. The method further comprises selecting a filter strength value based on the determined relative location of the current sample value with respect to the virtual boundary. The method further comprises filtering the current sample value based on the selected filter strength value.

According to a second aspect of the present disclosure there is provided a method for encoding or decoding an image of a video sequence. The method comprises obtaining a set of sample values associated with an image. The set of sample values comprises a current sample value and sample values neighboring the current sample value and the obtained set of sample values are included within a first rectangular block of sample values. The method further comprises determining a relative location of the current sample value with respect to a virtual boundary. The virtual boundary is defined with respect to a block boundary between the first block of sample values and a second block of sample values. The virtual boundary is parallel with the block boundary and separated from the block boundary by at least one row or column of sample values included in the first block of sample values. The method further comprises making a decision as to whether or not to filter the current sample value based on the determined relative location of the current sample value with respect to the virtual boundary.

According to a third aspect of the present disclosure there is provided a computer program comprising instructions which when executed by processing circuitry causes the processing circuitry to perform the method of any one of the first or the second aspect.

According to a fourth aspect of the present disclosure there is provided a carrier comprising the computer program according to the third aspect, wherein the carrier is one of an electronic signal, an optical signal, a radio signal, and a computer readable storage medium.

According to a fifth aspect of the present disclosure there is provided an apparatus, the apparatus being adapted to perform the method of the first or the second aspect.

BRIEF DESCRIPTION OF THE DRAWINGS

FIG. 8 shows an 8-tap 3×4 diamond CC-ALF filter coefficient respect to a luma sample location.
FIG. 9 shows a virtual horizontal boundary.
FIG. 17 shows a virtual horizontal boundary.

DETAILED DESCRIPTION

Figure 10:
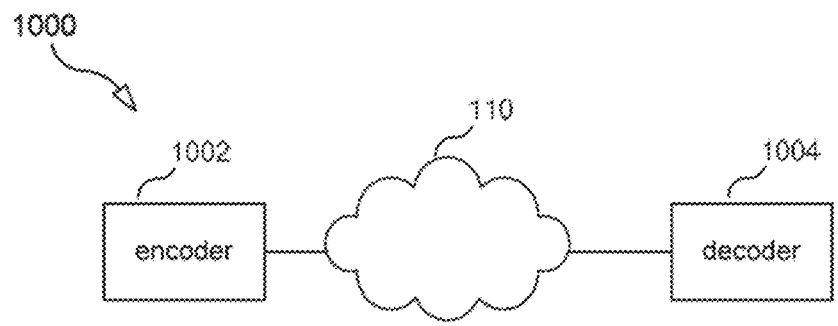
FIG. 10 illustrates a system 1000 according to an embodiment.

FIG. 10 illustrates a system 1000 according to an example embodiment. System 1000 includes an encoder 1002 and a decoder 1004. In the example shown, decoder 1004 can receive via a network 110 (e.g., the Internet or other network) encoded images produced by encoder 1002.

Figure 11:
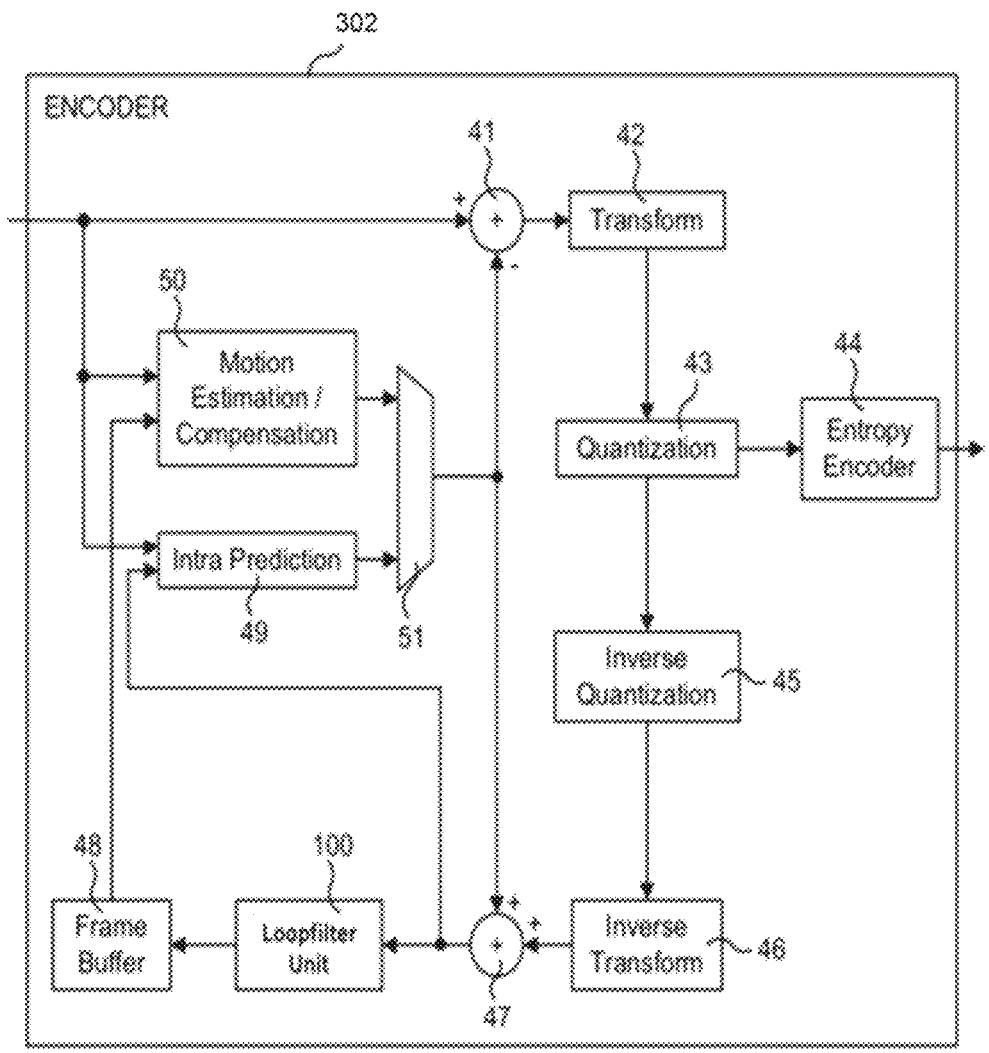
FIG. 11 is a schematic block diagram of an encoder according to an embodiment.

FIG. 11 is a schematic block diagram of encoder 1002. As illustrated in FIG. 11, The encoder 1002 takes in an original image and subtracts a prediction 41 that is selected 51 from either previously decoded samples ("Intra Prediction" 49) or samples from previously decoded frames stored in the frame buffer 48 through a method called motion compensation 50. The task of finding the best motion compensation samples is typically called motion estimation 50 and involves comparing against the original samples. After subtracting the prediction 41 the resulting difference is transformed 42 and subsequently quantized 43. The quantized results are entropy encoded 44 resulting in bits that can be stored, transmitted or further processed. The output from the quantization 43 is also inversely quantized 45 followed by an inverse transform 46. Then the prediction from 51 is added 47 and the result is forwarded to both the intra prediction unit 49 and to the Loopfilter Unit 100. The loopfilter unit 100 may do deblocking, SAO and/or ALF filtering (including CC-ALF filtering). The result is stored in the frame buffer 48, which is used for future prediction. Not shown in FIG. 11 is that coding parameters for other blocks such as 42, 43, 49, 50, 51 and 100 also may also be entropy coded.

Figure 12:
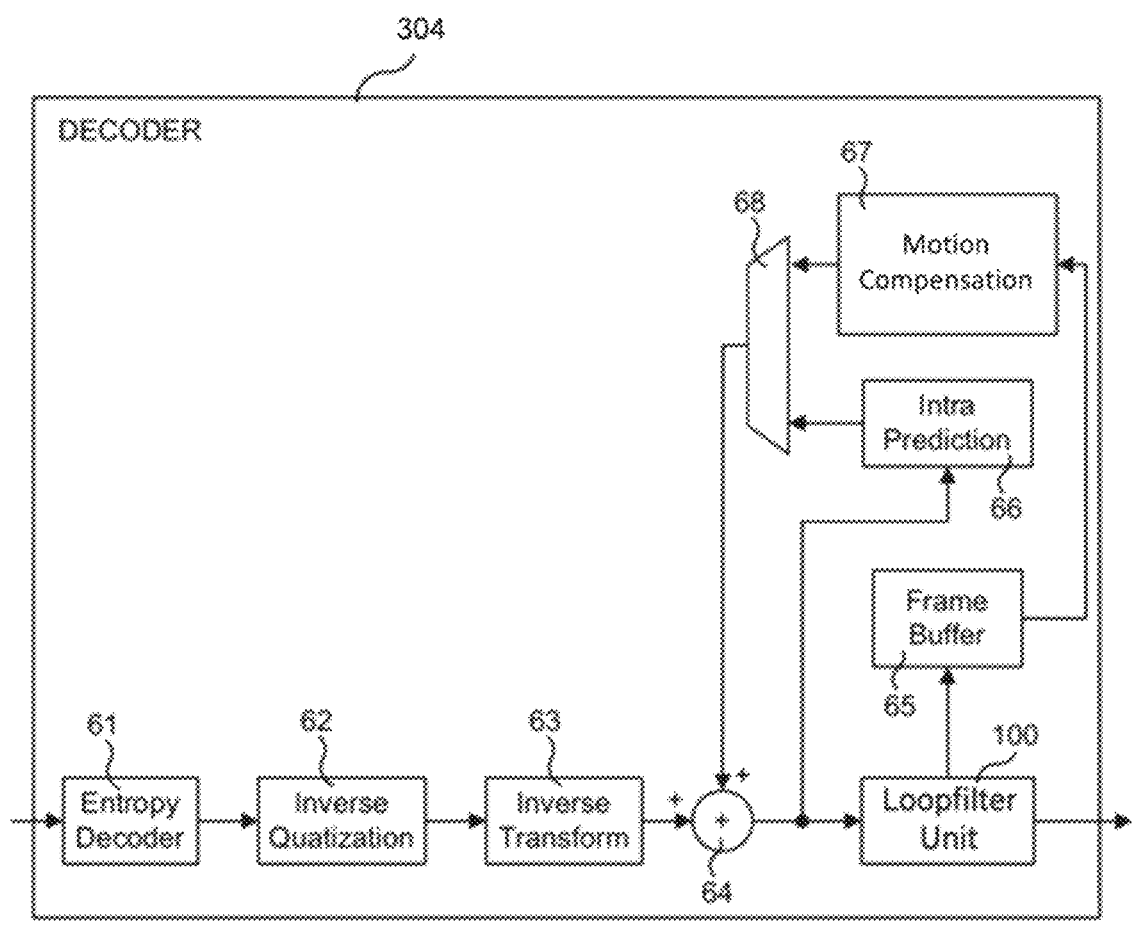
FIG. 12 is a schematic block diagram of an decoder according to an embodiment.
Figure 13:
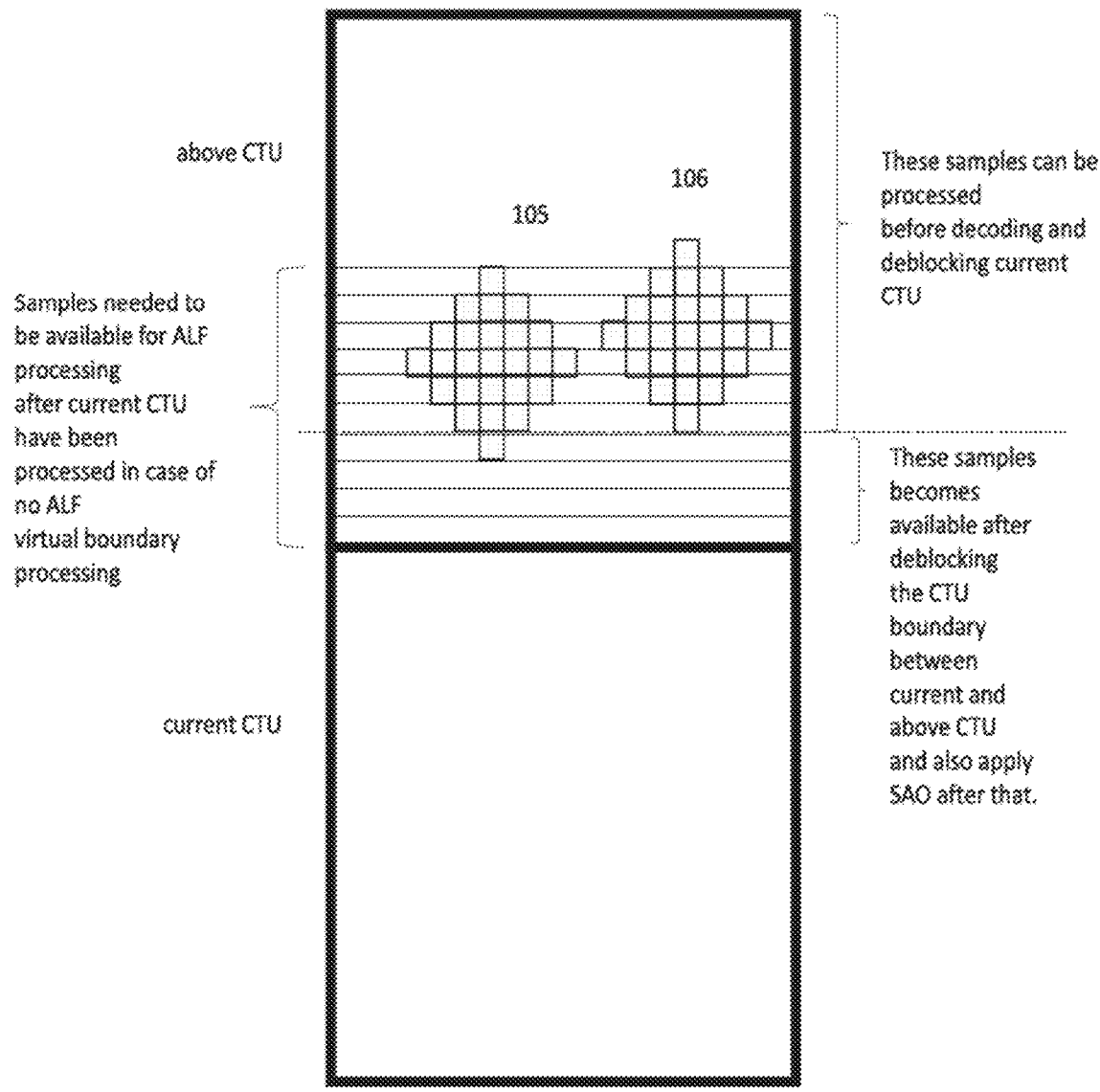
FIG. 13 shows that the line buffer requirement for ALF was 6 additional lines (rows).

FIG. 12 is a corresponding schematic block diagram of decoder 1004 according to some embodiments. The decoder 1004 takes in entropy coded transform coefficients which are then decoded by decoder 61. The output of decoder 61 then undergoes inverse quantization 62 followed by inverse transform 63 to form a decoded residual. To this decoded residual, a prediction is added 64. The prediction is selected 68 from either a motion compensation unit 67 or from an intra prediction unit 66. After having added the prediction to the decoded residual 64, the samples can be forwarded for intra prediction of subsequent blocks. The samples are also forwarded to the loopfilter unit 100, which may do deblocking, SAO processing, and/or ALF processing (including CC-ALF filtering). The output of the loopfilter unit 100 is forwarded to the frame buffer 65, which can be used for motion compensation prediction of subsequently decoded images 67. The output of the loopfilter unit 100 can also be output the decoded images for viewing or subsequent processing outside the decoder. Not shown in FIG. 12 is that parameters for other blocks such as 63, 67, 66 and 100 may also be entropy decoded. As an example, the coefficients for the ALF filter in block 100 may be entropy decoded.

The embodiments disclosed herein can be used to avoid generating artifacts from filtering of virtual boundaries in a still image or images of a video. This can be applied in encoder 1002 and/or decoder 1004. The approach is mainly described for virtual horizontal CTU boundaries but can be applicable also for virtual boundaries in general, such as for virtual vertical boundaries referring to columns instead of rows. The approach is also mainly described for ALF and for luma but could also be used for ALF for chroma and for CC-ALF.

Embodiment 1

When a sample to be filtered ("current sample") is "on" a virtual horizontal CTU boundary (i.e., when the current sample is in the row immediately above the virtual boundary) or current sample is in the row immediately above the row that is on the virtual horizontal CTU boundary (e.g. when the filters spatial coverage is reduced significantly from the intended spatial coverage, which is done to avoid having the filter to use samples on the other side of the virtual boundary), the filtering does not modify the current sample. Otherwise the filtering may modify the current sample.

This can be implemented by determining the vertical position before filtering and omit filtering if the determined position is at the virtual horizontal CTU boundary or the row above the virtual horizontal CTU boundary. If the virtual horizontal CTU boundary is at y=CtbSizeY−4 given in samples of the CTU where the top row of the CTU is row 0, then no filtering is applied when y is equal to CtbSizeY−4 or y is equal to CtbSizeY−5 (e.g. row above virtual boundary), otherwise filtering is applied.

Another approach to do exactly the same thing is to introduce horizontal padding such that all neighboring samples of the filter support are pointing at the current sample when the determined position is at the virtual horizontal CTU boundary or the row above the virtual horizontal CTU boundary and otherwise obey padding parameters such that filtering may modify the current sample. Changes to VCC in equation 1424 and in Table 43 as shown below:

$$\begin{aligned}\text{sum}=&f[\text{idx}[0]]*(\text{Clip3}(-c[\text{idx}[0]],c[\text{idx}[0]],\text{recPicture}_L\\&[h_x,v_{y+y3}]-\text{curr})+\text{Clip3}(-c[\text{idx}[0]],c[\text{idx}[0]],\\&\text{recPicture}_L[h_x,v_{y-y3}]-\text{curr}))+f[\text{idx}[1]]*(\text{Clip3}(-c\\&[\text{idx}[1]],c[\text{idx}[1]],\text{recPicture}_L[h_{x+x1},v_{y+y2}]-\\&\text{curr})+\text{Clip3}(-c[\text{idx}[1]],c[\text{idx}[1]],\text{recPicture}_L\\&[h_{x-x1},v_{y-y2}]-\text{curr}))+f[\text{idx}[2]]*(\text{Clip3}(-c[\text{idx}\\&[2]],c[\text{idx}[2]],\text{recPicture}_L[h_x,v_{y+y2}]-\text{curr})+\text{Clip3}\\&(-c[\text{idx}[2]],c[\text{idx}[2]],\text{recPicture}_L[h_x,v_{y-y2}]-\\&\text{curr}))+f[\text{idx}[3]]*(\text{Clip3}(-c[\text{idx}[3]],c[\text{idx}[3]],\\&\text{recPicture}_L[h_{x-x1},v_{y+y2}]-\text{curr})+\text{Clip3}(-c[\text{idx}\\&[3]],c[\text{idx}[3]],\text{recPicture}_L[h_{x+x1},v_{y-y2}]-\text{curr}))+f\\&[\text{idx}[4]]*(\text{Clip3}(-c[\text{idx}[4]],c[\text{idx}[4]],\text{recPicture}_L\\&[h_{x+2-x2},v_{y+y1}]-\text{curr})+\text{Clip3}(-c[\text{idx}[4]],c[\text{idx}[4]],\\&\text{recPicture}_L[h_{x-2+x2},v_{y-y1}]-\text{curr}))+f[\text{idx}[5]]*\\&(\text{Clip3}(-c[\text{idx}[5]],c[\text{idx}[5]],\text{recPicture}_L[h_{x+x1},\\&v_{y+y1}]-\text{curr})+\text{Clip3}(-c[\text{idx}[5]],c[\text{idx}[5]],\\&\text{recPicture}_L[h_{x-x1},v_{y-y1}]-\text{curr}))+f[\text{idx}[6]]*(\text{Clip3}\\&(-c[\text{idx}[6]],c[\text{idx}[6]],\text{recPicture}_L[h_x,v_{y+y1}]-\text{curr})+\\&\text{Clip3}(-c[\text{idx}[6]],c[\text{idx}[6]],\text{recPicture}_L[h_x,v_{y-y1}]-\\&\text{curr}))+f[\text{idx}[7]]*(\text{Clip3}(-c[\text{idx}[7]],c[\text{idx}[7]],\\&\text{recPicture}_L[h_{x-x1},v_{y+y1}]-\text{curr})+\text{Clip3}(-c[\text{idx}\\&[7]],c[\text{idx}[7]],\text{recPicture}_L[h_{x+x1},v_{y-y1}]-\text{curr}))+f\\&[\text{idx}[8]]*(\text{Clip3}(-c[\text{idx}[8]],c[\text{idx}[8]],\text{recPicture}_L\\&[h_{x-2+x2},v_{y+y1}]-\text{curr})+\text{Clip3}(-c[\text{idx}[8]],c[\text{idx}[8]],\\&\text{recPicture}_L[h_{x+2-x2},v_{y-y1}]-\text{curr}))+f[\text{idx}[9]]*\\&(\text{Clip3}(-c[\text{idx}[9]],c[\text{idx}[9]],\text{recPicture}_L[h_{x+3-x3},\\&v_y]-\text{curr})+\text{Clip3}(-c[\text{idx}[9]],c[\text{idx}[9]],\text{recPicture}_L\\&[h_{x-3+x3},v_y]-\text{curr}))+f[\text{idx}[10]]*(\text{Clip3}(-c[\text{idx}\\&[10]],c[\text{idx}[10]],\text{recPicture}_L[h_{x+2-x2},v_y]-\text{curr})+\\&\text{Clip3}(-c[\text{idx}[10]],c[\text{idx}[10]],\text{recPicture}_L[h_{x-2+x2},\\&v_y]-\text{curr}))+f[\text{idx}[11]]*(\text{Clip3}(-c[\text{idx}\\&[11]],c[\text{idx}[11]],\text{recPicture}_L[h_{x+x1},v_y]-\text{curr})+\text{Clip3}(-c[\text{idx}\\&[11]],c[\text{idx}[11]],\text{recPicture}_L[h_{x-x1},v_y]-\text{curr})).\end{aligned}$$ (1424)

| Condition | x1 | x2 | x3 | y1 | y2 | y3 |
|---|---|---|---|---|---|---|
| (y == CtbSizeY − 5 ‖ y == CtbSizeY − 4) && (applyAlfLineBufBoundary == 1) | 1 | 2 | 3 | 0 | 0 | 0 |
| (y == CtbSizeY − 6 ‖ y == CtbSizeY − 3) && (applyAlfLineBufBoundary == 1) | 0 | 0 | 0 | 1 | 1 | 1 |
| (y == CtbSizeY − 7 ‖ y == CtbSizeY − 2) && (applyAlfLineBufBoundary == 1) | 0 | 0 | 0 | 1 | 2 | 2 |
| Otherwise | 0 | 0 | 0 | 1 | 2 | 3 |

Embodiment 2

In this embodiment a specific reduction of the amount of filtering is applied for filtering of the current sample immediately adjacent to the virtual horizontal boundary (i.e., immediately above or immediately below the virtual boundary) and the row immediately above/below the row that is immediately adjacent to the virtual horizontal boundary. In that case the spatial coverage of the filter is reduced to only cover samples in the horizontal direction.

This can be implemented by determining the vertical position before filtering and specifically reduce the amount of filtering if the determined position is at the virtual horizontal CTU boundary or the row above the virtual horizontal CTU boundary. If the virtual horizontal CTU boundary is at y=CtbSizeY−4 given in samples of the CTU where the top row of the CTU is row 0. Then specifically reduce the amount of filtering when y is equal to CtbSizeY−4 or y is equal to CtbSizeY−5 (e.g. row above virtual boundary) otherwise no specifically reduction in the amount of filtering is applied.

More specifically, the amount of filtering refers to the strength of filtering. As an example, assume we have three samples $I_{LEFT}$, $I_{CENTER}$, $I_{RIGHT}$. A filtered version of the center sample can be expressed using differences as: $I_{FILTERED} = I_{CENTER} + [5*(I_{LEFT} - I_{CENTER}) + 5*(I_{RIGHT} - I_{CENTER})]/16$.

The above is equivalent to: $I_{FILTERED} = [5*I_{LEFT} + 6*I_{CENTER} + 5*I_{RIGHT}]/16$, which is very strong filtering. However, by changing the division by 16 to division by 32 (i.e., changing the divisor from a value of 16 to a value of 32), we get $I_{FILTERED} = I_{CENTER} + [5*(I_{LEFT} - I_{CENTER}) + 5*(I_{RIGHT} - I_{CENTER})]/32$.

This is equivalent to: $I_{FILTERED} = [5*I_{LEFT} + 22*I_{CENTER} + 5*I_{RIGHT}]/32$, which results in much weaker filtering, since the filtered version of the $I_{CENTER}$ value will on average deviate less from the original $I_{CENTER}$ value. It is also clear that, when the filter is expressed using differences, it is easy to change the strength of the filter just by changing the divisor from 16 to 32. Typically, the divisor can be defined as $x*2^{(-N)}$ where N is greater than 0. This can preferably be implemented by right shift, $x*2^{(-N)} = x >> N$, e.g. a right shift of x.

One approach to implement this in VVC is to determine a right shift factor which has a higher value when the determined vertical position is at a virtual horizontal CTU boundary or at the row above such a boundary than the value of the right shift factor otherwise. A reasonable increase of the right shift factor is by at least 2 e.g. basically reducing the contribution of the filtering to one fourth of the current value since the padding for luma corresponds to an increase of the contribution by 5 for the two horizontally adjacent samples to the current sample and for chroma corresponds to an increase of the contribution by 3 for the two horizontally adjacent samples to the current chroma sample. This can be achieved on top of the VVC specification by introducing an adaptive shift factor, alfShift. Thus, the amount of modification of the current sample curr can be reduced for samples on the vertical horizontal CTU boundary and the row above that row. In the example below for luma the right shift factor corresponds to alfShiftY and in this example the right shift is increased by 3 corresponding to reducing the contribution of the filtering to one eight of the current value.

$$\text{sum} = \text{curr} + ((\text{sum} + 64) >> \text{alfShift}Y)$$ (1425)

TABLE 43

Specification of y1, y2, y3, and alfShiftY according to the vertical luma sample position y and applyAlfLineBufBoundary

| Condition | alfShiftY | y1 | y2 | y3 |
|---|---|---|---|---|
| (y = = CtbSizeY − 5 ‖ y = = CtbSizeY − 4) && (applyAlfLineBufBoundary = = 1) | 10 | 0 | 0 | 0 |
| (y = = CtbSizeY − 6 ‖ y = = CtbSizeY − 3) && (applyAlfLineBufBoundary = = 1) | 7 | 1 | 1 | 1 |
| (y = = CtbSizeY − 7 ‖ y = = CtbSizeY − 2) && (applyAlfLineBufBoundary = = 1) | 7 | 1 | 2 | 2 |
| Otherwise | 7 | 1 | 2 | 3 |

In the example below for chroma where the right shift factor corresponds to alfShiftC and in this example the right shift is increased by 3 corresponding to reducing the contribution of the filtering to one eight of the current value.

$$sum = curr + ((sum + 64) >> alfShiftC) \quad (1466)$$

TABLE 44

Specification of y1, y2 and alfShiftC according to the vertical chroma sample position y and applyAlfLineBufBoundary

| Condition | alfShiftC | y1 | y2 |
|---|---|---|---|
| ( y = = ctbHeightC − 2 ‖ y = = ctbHeightC − 3) && ( applyAlfLineBufBoundary = = 1 ) | 10 | 0 | 0 |
| (y = = ctbHeightC − 1 ‖ y = = ctbHeightC − 4) && ( applyAlfLineBufBoundary = = 1 ) | 7 | 1 | 1 |
| Otherwise | 7 | 1 | 2 |

An alternative is to instead define an additional shift factor after the normal right shift factor as, example for luma below but same approach could be used for chroma as well, follows: $sum = curr + (((sum + 64) >> 7) >> alfShiftY)$ (1425)

| Condition | alfShiftY | y1 | y2 | y3 |
|---|---|---|---|---|
| (y = = CtbSizeY − 5 ‖ y = = CtbSizeY − 4) && (applyAlfLineBufBoundary = = 1) | 3 | 0 | 0 | 0 |
| (y = = CtbSizeY − 6 ‖ y = = CtbSizeY − 3) && (applyAlfLineBufBoundary = = 1) | 0 | 1 | 1 | 1 |
| (y = = CtbSizeY − 7 ‖ y = = CtbSizeY − 2) && (applyAlfLineBufBoundary = = 1) | 0 | 1 | 2 | 2 |
| Otherwise | 0 | 1 | 2 | 3 |

This would require one additional shift.

Embodiment 3

As embodiment 2 wherein the reduction of the filtering is depending on how many samples that are padded, such that most reduction of the contribution from the filtering is happening for filtering of samples immediately adjacent to the virtual horizontal boundary (i.e., samples immediately above the virtual boundary and samples immediately below the virtual boundary) and the row immediately above/below a row that is immediately adjacent to the virtual horizontal boundary.

One approach to do this on top of embodiment 2 is to vary the alfShiftY factor as follows: $sum = curr + ((sum + 64) >> alfShiftY)$ (1425)

| Condition | alfShiftY | y1 | y2 | y3 |
|---|---|---|---|---|
| (y = = CtbSizeY − 5 ‖ y = = CtbSizeY − 4) && (applyAlfLineBufBoundary = = 1) | 10 | 0 | 0 | 0 |
| (y = = CtbSizeY − 6 ‖ y = = CtbSizeY − 3) && (applyAlfLineBufBoundary = = 1) | 9 | 1 | 1 | 1 |
| (y = = CtbSizeY − 7 ‖ y = = CtbSizeY − 2) && (applyAlfLineBufBoundary = = 1) | 8 | 1 | 2 | 2 |
| Otherwise | 7 | 1 | 2 | 3 |

Thus the amount of change of the current sample curr is reduced more when more samples are padded.

Embodiment 4

In this embodiment an additional condition is checked to determine if filtering shall be applied or if filtering shall not be applied.

One condition that relates to the characteristics of the neighborhood for the current sample is to check if the neighborhood has structure with a vertical (gradients dominate in horizontal direction) or diagonal directionality (gradients dominate in diagonal direction +45/−45 degrees from the vertical axis) and if that's the case determine that filtering of the sample is not performed otherwise filtering can be performed. The reason for avoiding filters when the neighborhood has structure with vertical or diagonal directionality it is that the padded filter only make use of samples in the horizontal direction when filtering on the virtual horizontal CTU boundary and the row above the virtual horizontal CTU boundary which do not fit with the intent of the filters for such neighborhoods and can thus create visual artifacts. instead of improving the image.

With VVC as an example this can be implemented as follows. First determine if the current sample is on the virtual horizontal CTU boundary or the row above that and in that case also set the filter coefficients to 0 for categories of filters that correspond to neighborhoods of a current sample that has structure with vertical (gradients dominate in horizontal direction) or diagonal directionality (gradients dominate in diagonal direction +45/−45 degree from vertical axis). Neighborhoods of a current sample that corresponds to structure of horizontal directionality (gradients dominate in vertical direction) or no directionality (no dominating gradient direction) can be allowed to be filtered. This can for example be determined by checking the filterIdx and the transposeIdx that is determined as part of the classification which have been determined from computations of gradients vertically, horizontally and diagonally. If filterIdx is between 0 and 4 or between 15 and 24 and transposeIdx is equal to 0 filtering can be performed and otherwise it is not performed.

A variant which is more conservative is to only allow filtering for a current sample when it has a neighborhood that has structure with horizontal directionality. This can guarantee that the filtering does not degrade structure that has both vertical and horizontal directionality. This can be determined by checking if filterIdx is between 15 and 24 and transposeIdx is equal to 0 otherwise no filtering is performed. On the other hand, it reduces the possibility to remove coding artifacts.

Another variant is to only allow filtering as in above variants when filter coefficients have been determined specifically for the content which is being coded, e.g., provided in the bitstream. In VVC that can be discovered be checking if AlfCtbFiltSetIdxY is greater than or equal to 16 which means that filter coefficients have been provided in the bitstream and are not from a predetermined set of fixed filter coefficients specified in the standard.

Embodiment 5

For luma it first determines if the current sample to be filtered by ALF is immediately adjacent to the virtual horizontal CTU boundary or in a row immediately above/below the row that is immediately adjacent to the virtual horizontal CTU boundary. If that is the case it then determines if the filterIdx is less than 5 or if filterIdx is greater than 15

This embodiment is basically a combination of variants from embodiment 2 and 4.

For luma it first determines a first condition that checks if the current row to be filtered by ALF is at the virtual horizontal CTU boundary or the row above the virtual horizontal CTU boundary. If the condition is not fulfilled the ALF filtering is applied. If the condition is fulfilled it then checks a second condition that checks the filterIdx for the 4×4 block that includes the current sample to be filtered by ALF. The second condition is true if the filterIdx is less than 5 (isotropic neighborhood) or if filterIdx is greater than or equal to 15 but less than 25 and the transposeIdx is equal to 0 (neighborhood with horizontal directionality). If the second condition is true the amount of filtering is reduced by increasing the right shift factor in equation 1425 by two so that the contribution from filtering is reduced to a quarter of the normal filtering. Otherwise if the second condition not is true no filtering is applied for the current sample which can be described by setting x1=1, x2=2 and x3=3 (high-lighted in yellow) in the modified version of equation 1424. In software implementation this is identical to just omit filtering in this case.

$$sum = f[idx[0]]*(Clip3(-c[idx[0]],c[idx[0]],recPicture_L[h_x,v_{y+y3}]-curr)+Clip3(-c[idx[0]],c[idx[0]],recPicture_L[h_x,v_{y-y3}]-curr))+f[idx[1]]*(Clip3(-c[idx[1]],c[idx[1]],recPicture_L[h_{x+1-x1},v_{y+y2}]-curr)+Clip3(-c[idx[1]],c[idx[1]],recPicture_L[h_{x-1+x1},v_{y-y2}]-curr))+f[idx[2]]*(Clip3(-c[idx[2]],c[idx[2]],recPicture_L[h_x,v_{y+y2}]-curr)+Clip3(-c[idx[2]],c[idx[2]],recPicture_L[h_x,v_{y-y2}]-curr))+f[idx[3]]*(Clip3(-c[idx[3]],c[idx[3]],recPicture_L[h_{x-1+x1},v_{y+y2}]-curr)+Clip3(-c[idx[3]],c[idx[3]],recPicture_L[h_{x+1-x1},v_{y-y2}]-curr))+f[idx[4]]*(Clip3(-c[idx[4]],c[idx[4]],recPicture_L[h_{x+2-x2},v_{y+y1}]-curr)+Clip3(-c[idx[4]],c[idx[4]],recPicture_L[h_{x-2+x2},v_{y-y1}]-curr))+f[idx[5]]*(Clip3(-c[idx[5]],c[idx[5]],recPicture_L[h_{x+1-x1},v_{y+y1}]-curr)+Clip3(-c[idx[5]],c[idx[5]],recPicture_L[h_{x-1+x1},v_{y-y1}]-curr))+f[idx[6]]*(Clip3(-c[idx[6]],c[idx[6]],recPicture_L[h_x,v_{y+y1}]-curr)+Clip3(-c[idx[6]],c[idx[6]],recPicture_L[h_x,v_{y-y1}]-curr))+f[idx[7]]*(Clip3(-c[idx[7]],c[idx[7]],recPicture_L[h_{x-1+x1},v_{y+y1}]-curr)+Clip3(-c[idx[7]],c[idx[7]],recPicture_L[h_{x+1-x1},v_{y-y1}]-curr))+f[idx[8]]*(Clip3(-c[idx[8]],c[idx[8]],recPicture_L[h_{x-2+x2},v_{y+y1}]-curr)+Clip3(-c[idx[8]],c[idx[8]],recPicture_L[h_{x+2-x2},v_{y-y1}]-curr))+f[idx[9]]*(Clip3(-c[idx[9]],c[idx[9]],recPicture_L[h_{x+3-x3},v_y]-curr)+Clip3(-c[idx[9]],c[idx[9]],recPicture_L[h_{x-3+x3},v_y]-curr))+f[idx[10]]*(Clip3(-c[idx[10]],c[idx[10]],recPicture_L[h_{x+2-x2},v_y]-curr)+Clip3(-c[idx[10]],c[idx[10]],recPicture_L[h_{x-2+x2},v_y]-curr))+f[idx[11]]*(Clip3(-c[idx[11]],c[idx[11]],recPicture_L[h_{x+1-x1},v_y]-curr)+Clip3(-c[idx[11]],c[idx[11]],recPicture_L[h_{x-1+x1},v_y]-curr)).$$  (1424)

$$sum = curr + ((sum+64) >> alfShiftY)$$  (1425)

| Condition | alfShiftY | y1 | y2 | y3 |
|---|---|---|---|---|
| (y == CtbSizeY − 5 ‖ y == CtbSizeY − 4) && (applyAlfLineBufBoundary == 1) | 9 | 0 | 0 | 0 |
| (y == CtbSizeY − 6 ‖ y == CtbSizeY − 3) && (applyAlfLineBufBoundary == 1) | 7 | 1 | 1 | 1 |
| (y == CtbSizeY − 7 ‖ y == CtbSizeY − 2) && (applyAlfLineBufBoundary == 1) | 7 | 1 | 2 | 2 |
| Otherwise | 7 | 1 | 2 | 3 |

For chroma it first determines if the current row to be filtered by ALF is at the virtual horizontal CTU boundary or the row above the virtual horizontal CTU boundary. If that is the case it then reduces the amount of filtering by increasing the right shift factor in equation 1466 by two so that the contribution from filtering is reduced to a quarter of the normal filtering. Otherwise normal filtering is applied for the current sample.

$$sum = curr + ((sum+64) >> alfShiftC)$$  (1466)

TABLE 44

Specification of y1, y2 and alfShiftC according to the vertical chroma sample position y and applyAlfLineBufBoundary

| Condition | alfShiftC | y1 | y2 |
|---|---|---|---|
| (y == ctbHeightC − 2 ‖ y == ctbHeightC − 3) && (applyAlfLineBufBoundary == 1) | 9 | 0 | 0 |
| (y == ctbHeightC − 1 ‖ y == ctbHeightC − 4) && (applyAlfLineBufBoundary == 1) | 7 | 1 | 1 |
| Otherwise | 7 | 1 | 2 |

Embodiment 6

As in previous embodiments where a parameter is coded/decoded in encoded/decoded bitstream. When the parameter indicates if the approach is used or not used.

The parameter can be encoded/decoded at one of the following levels of the bitstream such as adaptive parameter set (APS), picture, slice or block.

Embodiment 7

In this embodiment an offset (alfShiftOffset) to the right shift parameter (7) in equation 1425 is coded/decoded in the video bitstream:

$$sum = curr + ((sum+64) >> (7+alfShiftOffset))$$  (1425)

The offset can be encoded/decoded at one of the following levels of the bitstream such as adaptive parameter set (APS), picture, slice or block. The range of the parameter can for example be 0 to 3 which corresponds to the capability to reduce the amount of filtering by ½, ¼ or ⅛.

Embodiment 8

As other embodiments but where the virtual boundary is a virtual vertical boundary and the row instead is a column to the left of the virtual vertical boundary. In this case, variants that only allow filtering when the structure has horizontal directionality is instead allowing filtering only when the structure has a vertical directionality.

Embodiment 9

As other embodiments but where the approach applies to luma and chroma components.

Embodiment 10

As other embodiments but where the approach only applies to luma.

Embodiment 11

In this embodiment the amount of reduction of the spatial coverage of the filter is restricted such that the spatial coverage of the filter at least includes neighboring samples at a distance of 1 from the center sample vertically and horizontally.

In the context of virtual horizontal CTU boundaries this can be achieved by modification of the position of the virtual horizontal CTU boundary by one row upwards (one row above the row that deblocking of current CTU can use) and at the same time allow for ALF filtering to read one row from the other side of the ALF virtual boundary. This enables the filter to at least include neighboring samples values at a distant of 1 from the center sample vertically. This avoids the extreme case of padding all neighboring rows, e.g. reduced the spatial coverage of a filter to only be horizontal, when filtering at the ALF virtual boundary or the row above the ALF virtual boundary.

Figure 14:
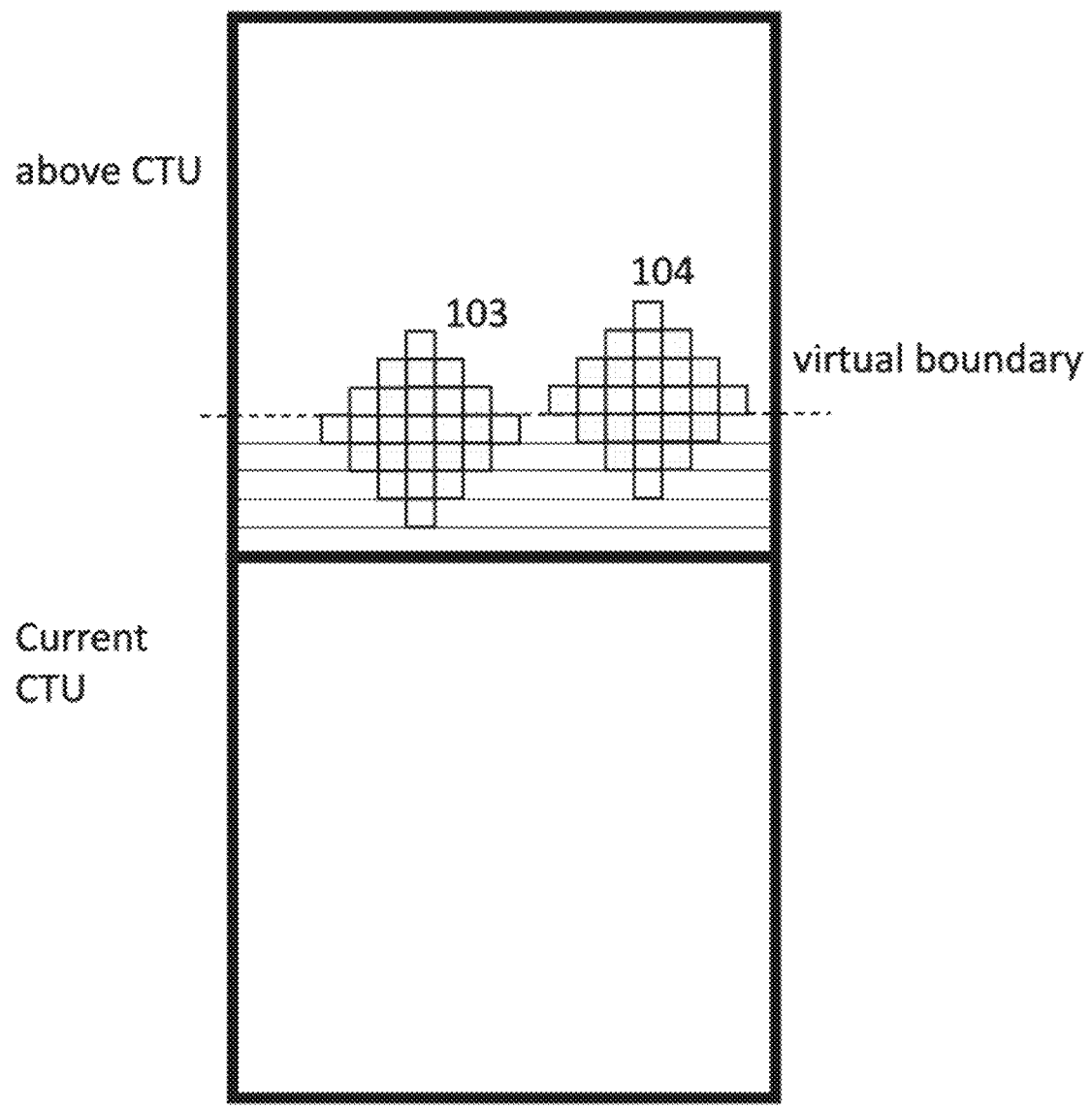
FIG. 14 shows a virtual horizontal boundary.

The position of the virtual horizontal boundary in this case is five samples above the top row of the current CTU inside the above CTU, as can be seen in FIG. 14.

The position of the filter when it is centered immediately below the virtual boundary, i.e., the position of the current sample is immediately below the virtual boundary, can be seen as in 103 and immediately above the virtual boundary as in 104, i.e., the current sample is immediately above the virtual boundary, in FIG. 14. Since the filter is allowed to read samples from one row below the virtual boundary when the center of the filter is in the row above the virtual boundary as in 104 or read samples above the virtual boundary when the center of the filter is in the row immediately below the virtual boundary as in 103, the amount of padding in this case is reduced to 4 lines of padding which is the most amount of padding that happens when the filter is allowed to read samples from one row on the other side of the virtual boundary. The padding in the case when the filter is at the row immediately above the virtual boundary, current sample on the row immediately above the virtual boundary, can be seen in FIG. 15. The padding in the case when the filter is at the row immediately below the virtual boundary, current sample on the row immediately below the virtual boundary, can be seen in FIG. 24. In FIG. 16 the filter is on the second row above the virtual boundary, i.e., the current sample is in the row that is immediately above the row that is immediately above the virtual boundary, and in this case only two rows need to be padded. In FIG. 25 the filter is on the second row below the virtual boundary, i.e., the current sample is in the row that is immediately below the row that is immediately below the virtual boundary, and in this case only two rows need to be padded.

Figure 1:
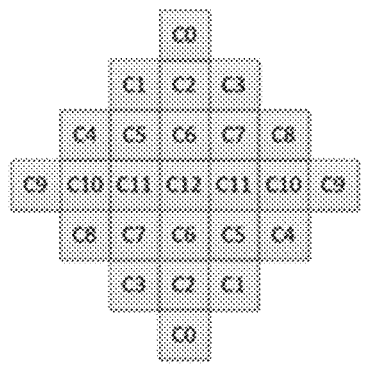
FIG. 1 illustrates an example of coefficient re-use.
Figure 2:
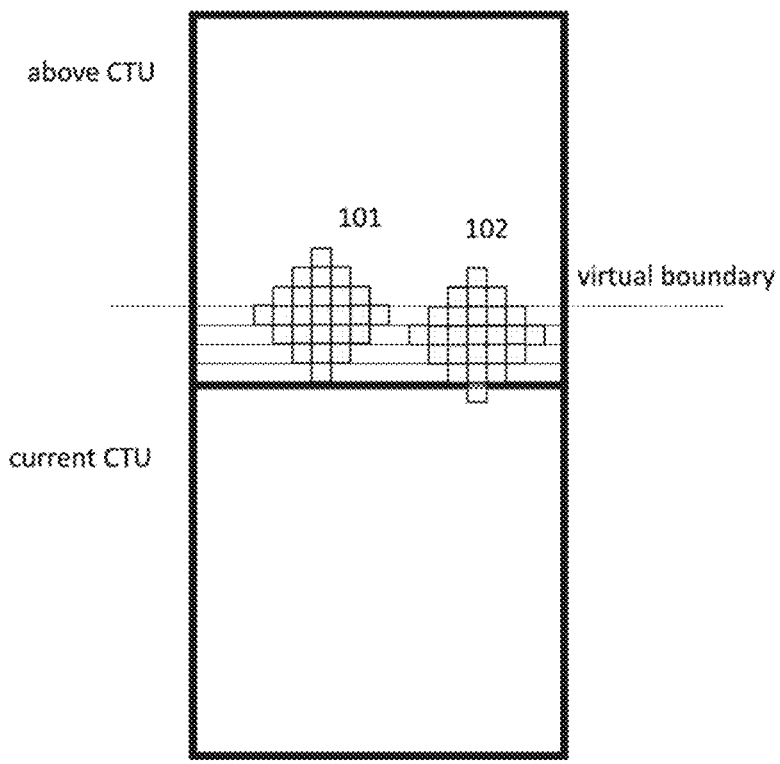
FIG. 2 shows a virtual horizontal boundary.
Figure 3:
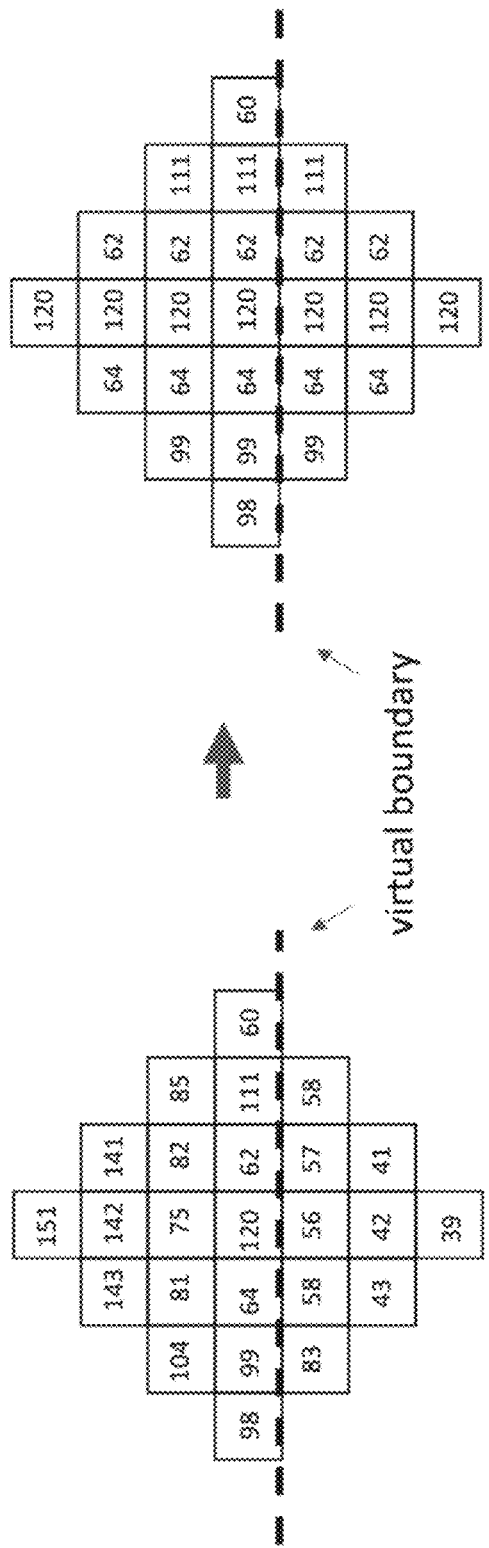
FIG. 3 shows a virtual horizontal boundary.
Figure 4:
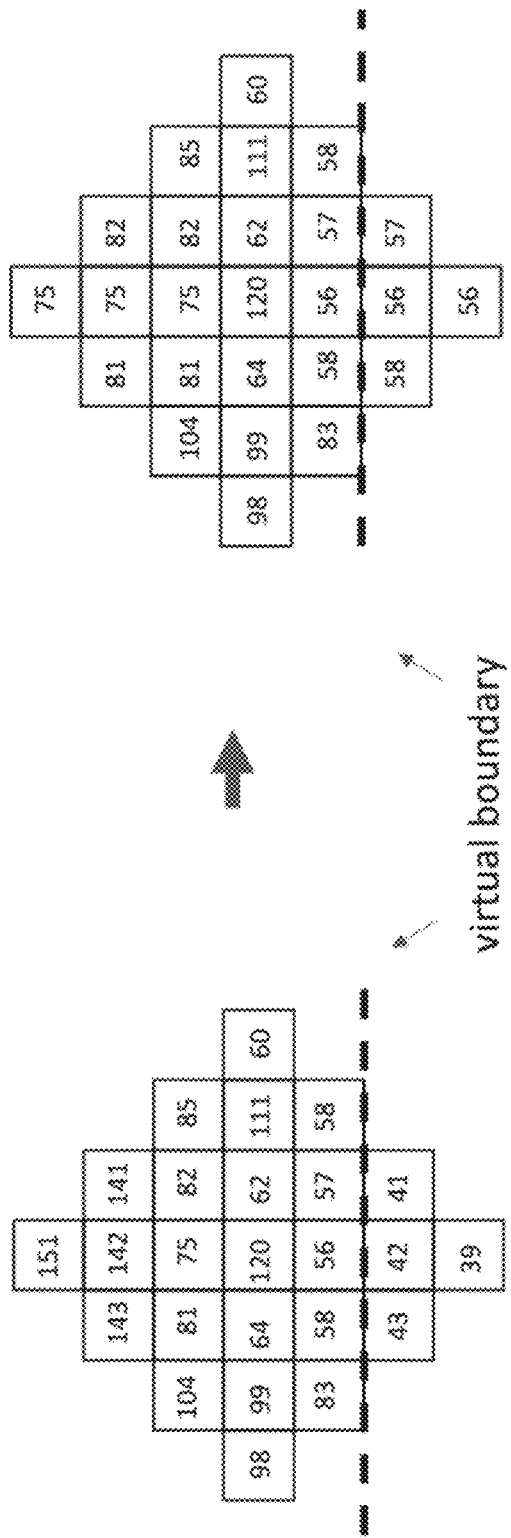
FIG. 4 shows a virtual horizontal boundary.

If we consider the virtual horizontal boundary, the ALF filter support due to the padding will be three rows, one row above and one row below the current row. This can be seen in FIG. 17. In the top left diagram, we have subtracted the middle sample (120) from all the values in FIG. 3. These values are then multiplied by the coefficients shown in the top right diagram of FIG. 17. However, this is the same thing as using zeros everywhere except in the three middle rows, as is shown in the right most diagram of FIG. 17. The contribution to the filtering from the samples on the same row as the center sample will be as intended (at position of C9, C10 and C11 in Fig I). The contribution from the samples on the row above and the row below the center sample will be amplified when they are closer to the center and the filter coefficient for respective sample in the row above the center will be equal to the sum of the coefficients vertically aligned and above, and the filter coefficients for respective sample in the row below will be equal to the sum of the coefficients vertically and below (2*(C5+C1), 3*(C6+C2+C0), 2*(C7+C3) and in FIG. 17).

Figure 5:
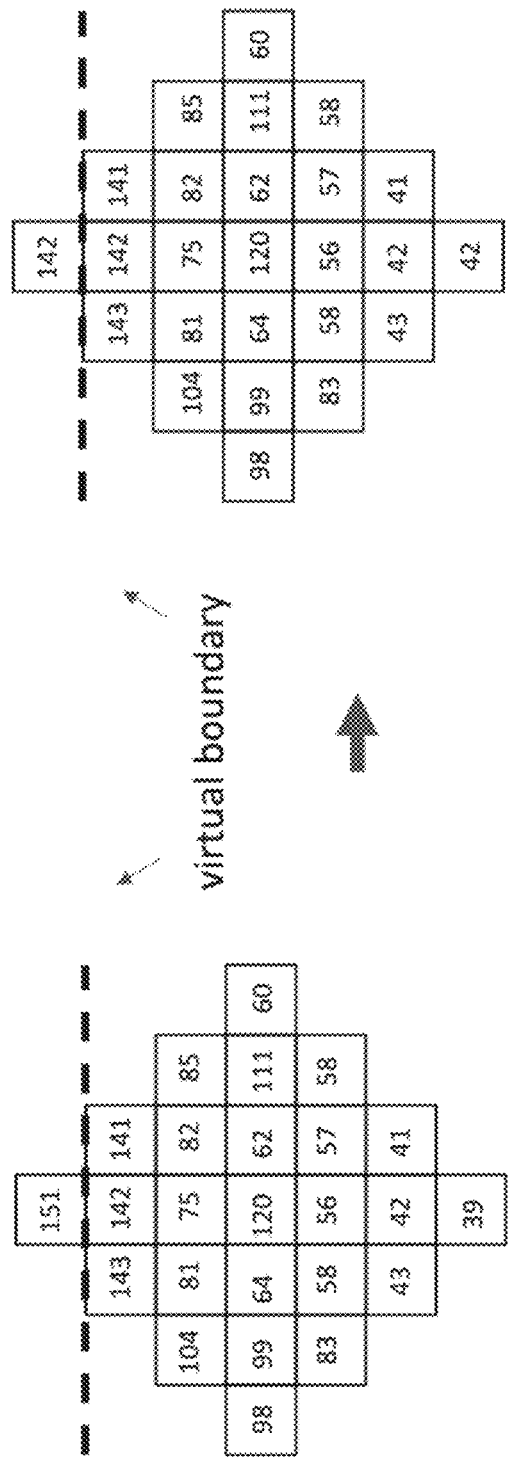
FIG. 5 shows a virtual horizontal boundary.
Figure 6:
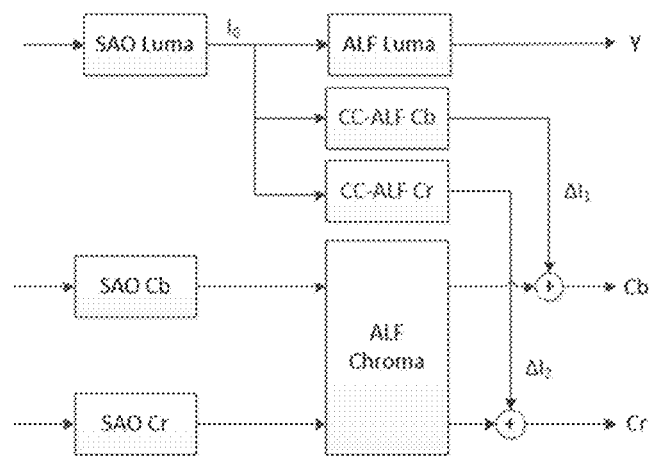
FIG. 6 illustrates the placement of CC-ALF with respect to other loop filters.
Figure 7:
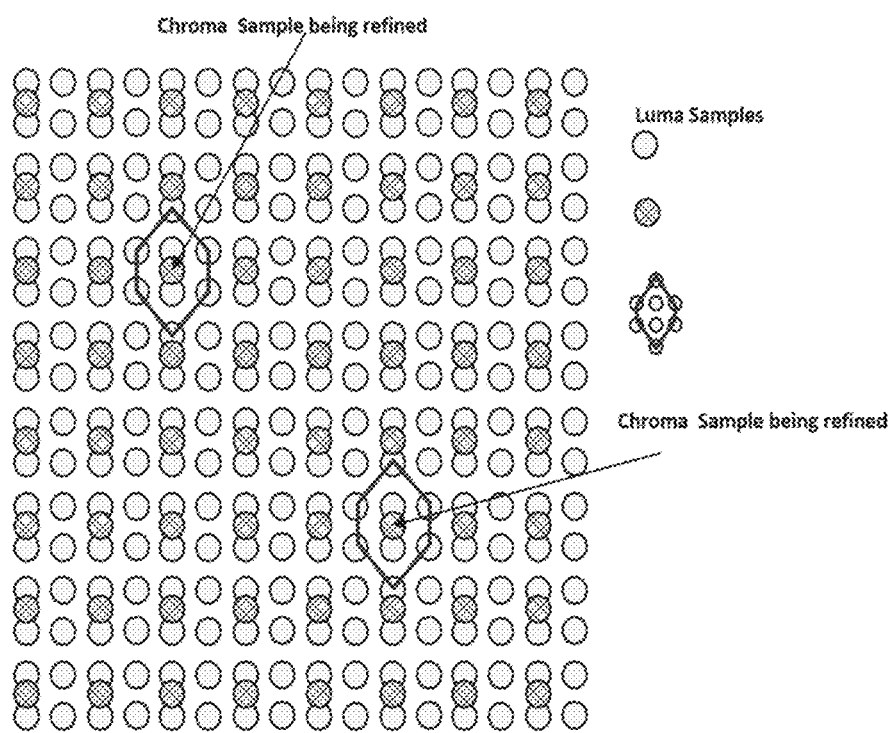
FIG. 7 shows the CE anchor CC-ALF filter shape.

Compared to the extreme padding of ALF filtering of the virtual horizontal CTU boundary as in the current VVC draft where amplified contributions from only the center row of samples are used as shown in FIG. 5 this embodiment reduce the amplification by about half and the amplification is spread for samples both above and below the current sample which makes the filtering more robust and without the artifacts of the extreme padding approach.

This filtering approach can be achieved for luma by replacing Table 43 of the current VVC draft with the following table:

| Condition | y1 | y2 | y3 |
|---|---|---|---|
| ( y = = CtbSize Y − 6 ‖ y = = CtbSizeY − 5 ) && ( applyAlfLineBufBoundary = = 1 ) | 1 | 1 | 1 |
| ( y = = CtbSize Y − 7 ‖ y = = CtbSizeY − 4 ) && ( applyAlfLineBufBoundary = = 1 ) | 1 | 2 | 2 |
| Otherwise | 1 | 2 | 3 |

For chroma this can be achieved by replacing table 44 of the current VVC draft with the following table:

| Condition | y1 | y2 |
|---|---|---|
| ( y = = ctbHeightC − 3 ‖ y = = ctbHeightC − 4 ) && ( applyAlfLineBufBoundary = = 1 ) | 1 | 1 |
| Otherwise | 1 | 2 |

This embodiment increases the line buffer requirements by two lines (rows) as can be seen from position 103 in FIG. 14. This embodiment also affects luma with regards to the ALF classification which is performed for every 4×4 block based on a neighborhood of 8×8 (e.g. two sample outside the block in all directions) since it will have a virtual horizontal boundary inside a 4×4 block. One solution to that is to base the classification on the bottom half of the rows (row 2 and 3 not row 0 and 1) and samples from the row below the 4×4 block (neighborhood 4×8) for filtering below the virtual boundary and base the classification on the upper half of the rows (row 0 and 1) and samples from the row above the 4×4 block (neighborhood 4×8) for filtering above the virtual boundary. A simpler and perhaps also more robust solution is to use same classification both above and below the virtual boundary. In such a solution the classification can be made for the whole 4×4 block (row 0 to 3) and samples from the row above the 4×4 block (neighborhood 6×8) and then this classification is used for filtering of all samples inside the 4×4 block irrespectively if samples are below or above the virtual boundary. That would require an additional line buffer for storing classification index (0-24) and transpose index (0-3) which corresponds to 7 bits times 3840/4 bits for 4K video (e.g. about 800 bytes). This would still be less than half of the number of line buffers for not using virtual boundaries at all since in that case you would need to store 6 additional lines for luma (rows) where one line of luma samples for 4K video at a bit depth of 10 corresponds to 10*3840 bits (e.g. about 4800 bytes).

The simplest modification to the classification in VVC is to use the same classification above and below the virtual boundary considering that the virtual boundary row also is available when filtering the row above the virtual boundary row, which can be performed by just removing a adjustment for minY and maxY for the last 4×4 blocks in the CTU which starts when y4 is equal to CtbSizeY−4 shown in the table below which shows changes to the current VVC draft. We still need to keep the adjustment for the second last rows of 4×4 blocks in the CTU since we cannot read samples below the last row of that 4×4 block:

---

8.8.5.3 Derivation process for ALF transpose and filter index for luma samples
..
The variables applyAlfLineBufBoundary, minY, maxY, and ac[ x ][ y ] are derived as follows:
If y4 is equal to ( CtbSizeY − 8 ) and one of the following condition is true, minY is set equal to −2, maxY is set equal to 3, applyAlfLineBufBoundary is set equal to 1, and ac[ x ][ y ] is set equal to 96.
The bottom boundary of the current coding tree block is the bottom boundary of the picture and pic_height_in_luma_samples − yCtb > CtbSizeY − 4.
The bottom boundary of the current coding tree block is not the bottom boudary of the picture.
[[Otherwise, if y4 is equal to ( CtbSizeY − 4 ) and one of the following condition is true, minY is set equal to 0, maxY is set equal to 5, applyAlfLineBufBoundary is set equal to 1, and ac[ x ][ y ] is set equal to 96.
The bottom boundary of the current coding tree block is the bottom boundary of the picture and pic_height_in_luma_samples − yCtb > CtbSizeY − 4.
The bottom boundary of the current coding tree block is not the bottom boudary of the picture]]
Otherwise, minY is set equal to −2 and maxY is set equal to 5, applyAlfLineBufBoundary is set equal to 0 and ac[ x ][ y ] is set equal to 64.

---

Another solution to the classification is to use the two rows in the upper half of the 4×4 blocks that includes the virtual boundary for filtering above the boundary and the two rows in the lower half of the 4×4 block for filtering at or below the boundary. Thus, it is needed to perform specific classifications for respective half of the 4×4 blocks that includes the virtual boundary. The way the standard is written this requires storage of two versions of the classification for such 4×4 blocks. The modification of the classification can be specified in VVC as shown in the table below:

---

8.8.5.3 Derivation process for ALF transpose and filter index for luma samples
..
The variables applyAlfLineBufBoundary, minY, maxY, and ac[ x ][ y ] are derived as follows:
If y4 is equal to ( CtbSize Y − 8 ) and one of the following condition is true, minY is set equal to −2, maxY is set equal to 1, minYB is set equal to 2, maxYB is set equal to 5, applyAlfLineBufBoundary is set equal to 1, and ac[ x ][ y ] is set equal to 128.
The bottom boundary of the current coding tree block is the bottom boundary of the picture and pic_height_in_luma_samples − yCtb > CtbSizeY − 4.
The bottom boundary of the current coding tree block is not the bottom boudary of the picture.
[[Otherwise, if y4 is equal to ( CtbSize Y − 4 ) and one of the following condition is true, minY is set equal to 0, maxY is set equal to 5, applyAlfLineBufBoundary is set equal to 1, and ac[ x ][ y ] is set equal to 96.
The bottom boundary of the current coding tree block is the bottom boundary of the picture and pic_height_in_luma_samples − yCtb > CtbSizeY − 4.
The bottom boundary of the current coding tree block is not the bottom boudary of the picture]]
Otherwise, minY is set equal to −2 and maxY is set equal to 5, applyAlfLineBufBoundary is set equal to 0 and ac[ x ][ y ] is set equal to 64.
If y is equal to (CtbSizeY − 6) or if y is equal to (CtbSizeY − 5) an additional classification is made:
The additional variables sumHB[ x ][ y ], sumVB[ x ][ y ], sumD0B[ x ][ y ], sumD1B[ x ][ y ] and sumOfHVB[ x ][ y ] are derived as follows:

$$\text{sumHB}[\, x\, ][\, y\, ] = \Sigma_i \Sigma_j\, \text{filtH}[\, i\, ][\, j\, ], \text{ with } i = -2..5, j = \text{minYB..maxYB} \qquad (1433)$$

$$\text{sumVB}[\, x\, ][\, y\, ] = \Sigma_i \Sigma_j\, \text{filtV}[\, i\, ][\, j\, ], \text{ with } i = -2..5, j = \text{minYB..maxYB} \qquad (1434)$$

$$\text{sumD0B}[\, x\, ][\, y\, ] = \Sigma_i \Sigma_j\, \text{filtD0}[\, i\, ][\, j\, ], \text{ with } i = -2..5, j = \text{minYB..maxYB} \qquad (1435)$$

$$\text{sumD1B}[\, x\, ][\, y\, ] = \Sigma_i \Sigma_j\, \text{filtD1}[\, i\, ][\, j\, ], \text{ with } i = -2..5, j = \text{minYB..maxYB} \qquad (1436)$$

$$\text{sumOfHVB}[\, x\, ][y\, ] = \text{sumH}[\, x\, ][\, y\, ] + \text{sumV}[\, x\, ][\, y\, ] \qquad (1437)$$

-continued

```
The variables dir1B[ x ][ y ], dir2B[ x ][ y ] and dirSB[ x ][ y ] are derived as follows:
The variables hv1B, hv0B and dirHVB are derived as follows:
If sumVB[ x >> 2 ][ y >> 2 ] is greater than sumHB[ x >> 2 ][ y >> 2], the following applies:
hv1B = sumVB[ x >> 2 ][ y >> 2 ]                                   (1438)
hv0B = sumHB[ x >> 2 ][ y >> 2 ]                                   (1439)
dirHVB = 1    (1440)
Otherwise, the following applies:
hv1B = sumHB[ x >> 2 ][ y >> 2 ]                                   (1441)
hv0B = sumVB[ x >> 2 ][ y >> 2 ]                                   (1442)
dirHVB = 3    (1443)
The variables d1B, d0B and dirDB are derived as follows:
If sumD0B[ x >> 2 ][ y >> 2 ] is greater than sumD1B[ x >> 2 ][ y >> 2 ], the following
applies:
d1B = sumD0B[ x >> 2 ][ y >> 2 ]                                   (1444)
d0B = sumD1B[ x >> 2 ][ y >> 2 ]                                   (1445)
dirDB = 0    (1446)
Otherwise, the following applies:
d1B = sumD1B[ x >> 2 ][ y >> 2 ]                                   (1447)
d0B = sumD0B[ x >> 2 ][ y >> 2 ]                                   (1448)
dirDB = 2    (1449)
The variables hvd1B, hvd0B, are derived as follows:
hvd1B = ( d1B * hv0B > hv1B * d0B ) ? d1B : hv1B                   (1450)
hvd0B = ( d1B * hv0B > hv1B * d0B ) ? d0B : hv0B                   (1451)
The variables dirSB[ x ][ y ], dir1B[ x ][ y ] and dir2B[ x ][ y ] derived as follows:
dir1B[ x ][ y ] = ( d1B * hv0B > hv1B * d0B ) ? dirDB : dirHVB     (1452)
dir2B[ x ][ y ] = ( d1B * hv0B > hv1B * d0B ) ? dirHVB : dirDB     (1453)
dirSB[ x ][ y ] = ( hvd1B * 2 > 9 * hvd0B ) ? 2 : ( ( hvd1B > 2 * hvd0B ) ? 1 : 0 )   (1454)
The variable avgVarB[ x ][ y ] is derived as follows:
varTab[ ] = { 0, 1, 2, 2, 2, 2, 2, 3, 3, 3, 3, 3, 3, 3, 3, 4 }     (1455)
avgVarB[ x ][ y ] = varTab[ Clip3( 0, 15,                          (1456)
  ( sumOfHVB[ x >> 2 ][ y >> 2 ] * ac[ x >> 2 ][ y >> 2 ] ) >> (4 + BitDepth ) ) ]
The additional classification filter index array filtIdxB[ x ][ y ] and the transpose index array
transposeIdxB[ x ][ y ] are derived as follows:
transposeTable[ ] = { 0, 1, 0, 2, 2, 3, 1, 3 }
transposeIdxB[ x ][ y ] = transposeTable[ dir1B[ x ][ y ] * 2 + ( dir2B[ x ][ y ] >> 1 ) ]
filtIdxB[ x ][ y ] = avgVarB[ x ][ y ]
When dirSB[ x ][ y ] is not equal 0, filtIdxB[ x ][ y ] is modified as follows:
filtIdxB[ x ][ y ] += ( ( ( dir1B[ x ][ y ] & 0x1 ) << 1 ) + dirSB[ x ][ y ] ) * 5       (1457)
The classification filter index array filtIdx[ x ][ y ] and the transpose index array
transposeIdx[ x ][ y ] with x = y = 0..CtbSizeY − 1 are derived as follows:
transposeTable[ ] = { 0, 1, 0, 2, 2, 3, 1, 3 }
transposeIdx[ x ][ y ] = transposeTable[ dir1[ x ][ y ] * 2 + ( dir2[ x ][ y ] >> 1 ) ]
filtIdx[ x ][ y ] = avgVar[ x ][ y ]
When dirS[ x ][ y ] is not equal 0, filtIdx[ x ][ y ] is modified as follows:
filtIdx[ x ][ y ] += ( ( ( dir1[ x ][ y ] & 0x1 ) << 1 ) + dirS[ x ][ y ] ) * 5         (1457)
If y is equal to (CtbSizeY−6) or if y is equal to (CtbSizeY−5)
transposeIdx [ x ][ y ] += transposeIdxB [ x ][ y ] << 2
filterIdx [ x ][ y ] += filterIdxB [ x ][ y ] << 5
```

Then it is also needed to modify the filtering such that correct class is used for rows CtbSize-6 and CtbSize-5 which can be described as follows in VVC:

```
8.8.5.2 Coding tree block filtering process for luma samples
..
For the derivation of the filtered reconstructed luma samples alfPicture_L[ x ][ y ], each
reconstructed luma sample inside the current luma coding tree block recPicture_L[ x ][ y ] is
filtered as follows with x, y = 0..CtbSizeY − 1:
If y is equal to (CtbSizeY−6) or if y is equal to (CtbSizeY−5) then
filterIdx[ x ][ y ] = filterIdx[ x ][ y ] >> 5
transposeIdx[ x ][ y ] = transposeIdx[ x ][ y ] >> 2
Otherwise
filterIdx[ x ][ y ] = filterIdx[ x ][ y ] && 31
transposeIdx[ x ][ y ] = transposeIdx [ x ][ y ] && 3
```

Embodiment 12

Combinations between one or several embodiments.

Figure 18:
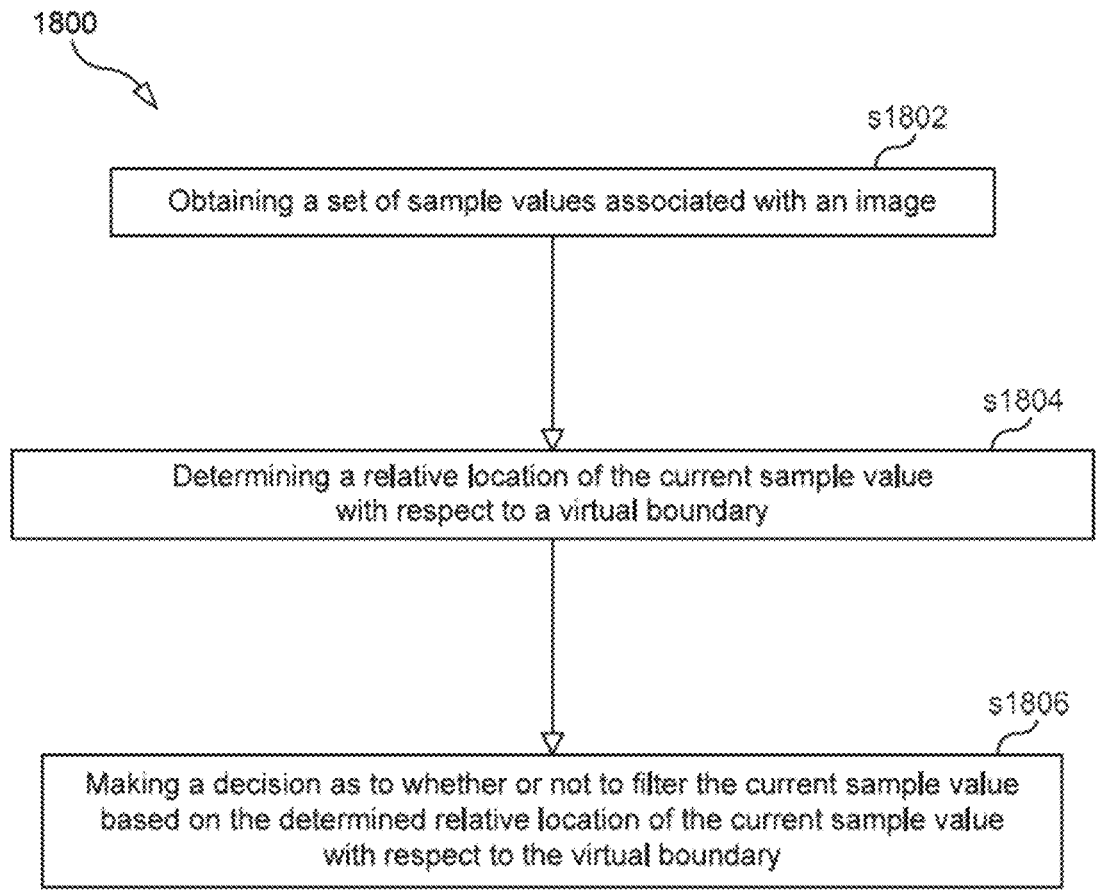
FIG. 18 is a flow chart illustrating a process according to an embodiment.

FIG. 18 is a flow chart illustrating a process 1800 for processing (e.g., encoding or decoding) an image. Process 1800 may begin in step s1802.

Step s1802 comprises obtaining a set of sample values associated with an image. The set of sample values comprises a current sample value and sample values neighboring the current sample value and the obtained set of sample values are included within a first rectangular block of sample values.

Step s1804 comprises determining a relative location of the current sample value with respect to a virtual boundary. The virtual boundary is defined with respect to a block boundary between the first block of sample values and a second block of sample values. The virtual boundary is parallel with the block boundary and separated from the block boundary by at least one row or column of sample values included in the first block of sample values.

Step s1806 comprises making a decision as to whether or not to filter the current sample value based on the determined relative location of the current sample value with respect to the virtual boundary.

In some embodiments, making a decision as to whether or not to filter the current sample value based on the determined relative location of the current sample comprises determining whether the current sample value is adjacent to (e.g., not more than one row or column away from) the virtual boundary and as a result of determining that the current sample value is adjacent to the virtual boundary, making a decision to refrain from filtering the current sample value.

In some embodiments, making a decision as to whether or not to filter the current sample value based on the determined relative location of the current sample with respect to the virtual boundary comprises making the decision based not only on the determined relative location of the current sample with respect to the virtual boundary but also on a characteristic of a block of sample values comprising the current sample value.

Figure 19:
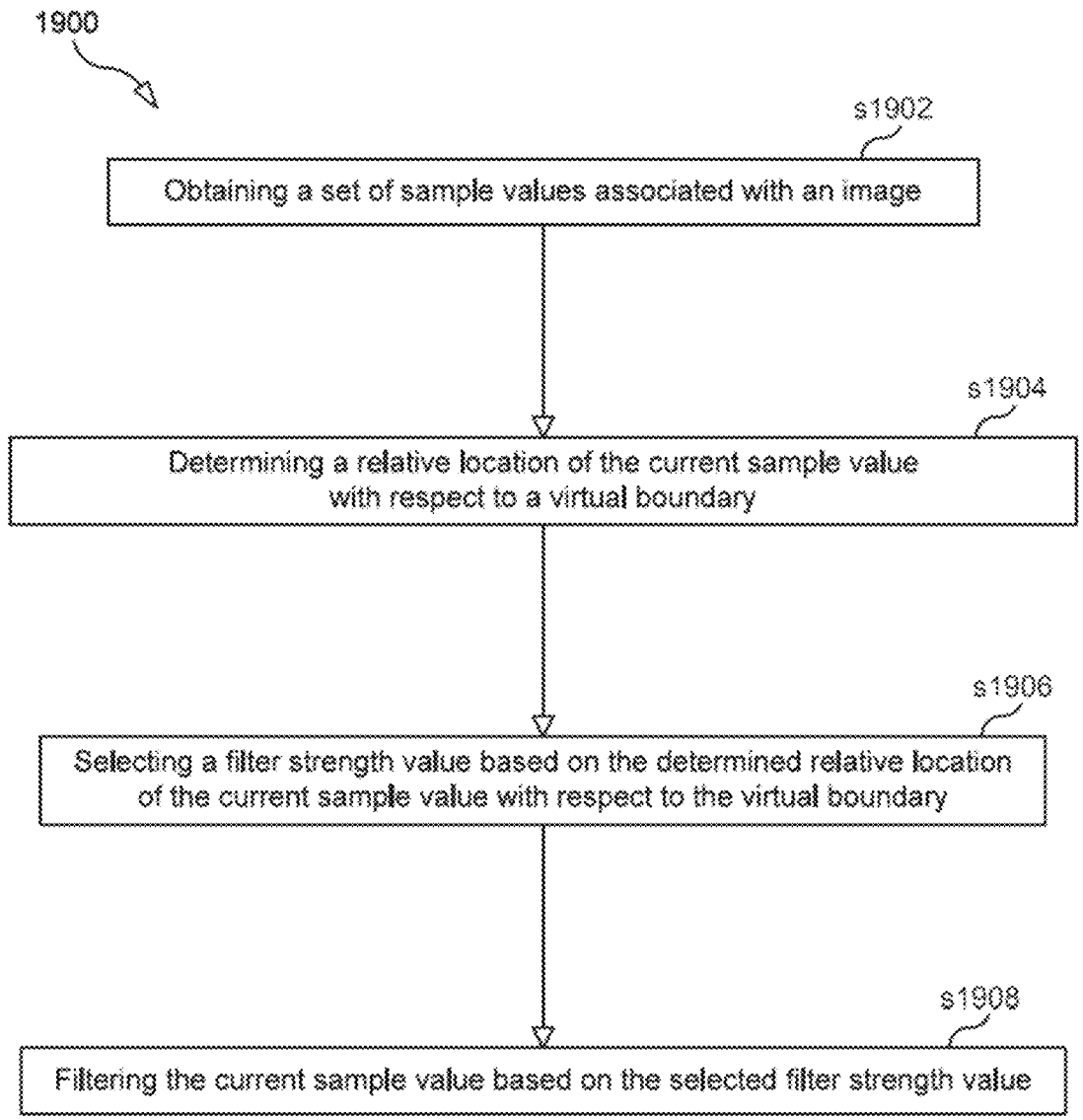
FIG. 19 is a flow chart illustrating a process according to an embodiment.

FIG. 19 is a flow chart illustrating a process 1900 for processing an image. Process 1900 may begin in step s1902.

Step s1902 comprises obtaining a set of sample values associated with an image. The set of sample values comprises a current sample value and sample values neighboring the current sample value. The obtained set of sample values is included within a first rectangular block of sample values.

Step s1904 comprises determining a relative location of the current sample value with respect to a virtual boundary. The virtual boundary is defined with respect to a block boundary between the first block of sample values and a second block of sample values. The virtual boundary is parallel with the block boundary and separated from the block boundary by at least one row or column of sample values included in the first block of sample values.

Step s1906 comprises selecting a filter strength value based on the determined relative location of the current sample value with respect to the virtual boundary.

Step s1908 comprises filtering the current sample value based on the selected filter strength value.

In some embodiments, selecting a filter strength value based on the determined relative location of the current sample with respect to the virtual boundary comprises selecting a right shift value (e.g., N, where N is a whole number >0) or a divisor (e.g., a value equal to 2−N) based on the determined relative location of the current sample with respect to the virtual boundary, and filtering the current sample based on the selected filter amount comprises filtering the current sample value using the selected right shift value or divisor.

In some embodiments, selecting a filter strength value based on the determined relative location of the current sample with respect to the virtual boundary comprises: selecting a first filter strength value if it is determined that the current sample value is adjacent to the virtual boundary; or selecting a second filter strength value if it is determined that the current sample value is more the one row or column away from the virtual boundary.

In some embodiments, the first filter strength value is greater than 7 and the second filter strength value is less than or equal to 7, or the first filter strength value is greater than or equal to 1 (e.g., 3) and the second filter strength value is 0 (in this embodiment the selected filter strength value function as a filter strength adjustment).

In some embodiments, selecting a filter strength value based on the determined relative location of the current sample with respect to the virtual boundary comprises: selecting a first filter strength value if it is determined that the current sample value is not more the one row or column away from the virtual boundary; or selecting a filter strength value from a set of filter strength values if it is determined that the current sample value is more the one row or column away from the virtual boundary, wherein the set of filter strength values comprises a second filter strength value (e.g., 9), a third filter strength value (e.g. 8), and a fourth filter strength value (e.g., 7).

In some embodiments, selecting a filter strength value from the set of filter strength values if it is determined that the current sample value is more the one row or column away from the virtual boundary comprises: selecting the second filter strength value if it is determined that the current sample value is two rows or columns away from the virtual boundary; selecting the third filter strength value if it is determined that the current sample value is three rows or columns away from the virtual boundary; or selecting the fourth filter strength value if it is determined that the current sample value is at least four rows or columns away from the virtual boundary.

In some embodiments, selecting a filter strength value based on the determined relative location of the current sample with respect to the virtual boundary comprises selecting the filter strength value based not only on the determined relative location of the current sample with respect to the virtual boundary but also on a characteristic of a block of sample values comprising the current sample value.

Figure 20:
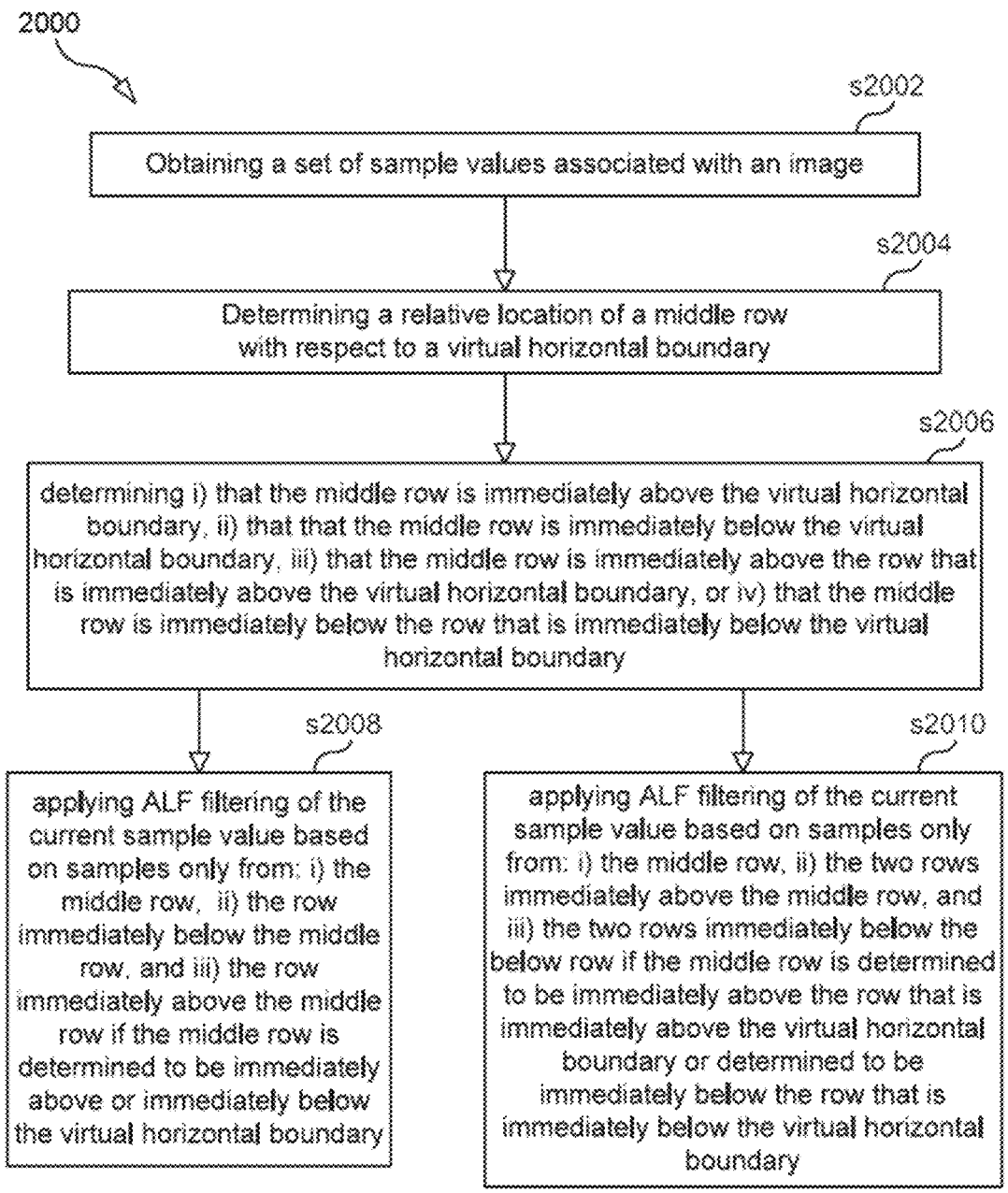
FIG. 20 is a flow chart illustrating a process according to an embodiment.

FIG. 20 is a flow chart illustrating a process 2000 for processing an image. Process 2000 may begin in step s2002.

Step s2002 comprises obtaining a set of sample values associated with an image, the set of sample values comprising a current sample value and a set of neighboring sample values neighboring the current sample value, wherein the obtained set of sample values is included within a first rectangular block of sample values, and wherein the obtained set of sample values is logically arranged in a plurality of rows of sample values, said plurality of rows consisting of a middle row, rows above the middle row, and rows below the middle row, the current sample value being in said middle row.

Step s2004 comprises determining a relative location of the middle row with respect to a virtual horizontal boundary, wherein the virtual horizontal boundary is defined with respect to a horizontal block boundary between the first block of sample values and a second block of sample values, wherein the virtual horizontal boundary is parallel with the block boundary and separated from the block boundary by at least one row of sample values included in the first block of sample values.

Step s2006 comprises determining i) that the middle row is immediately above the virtual horizontal boundary (FIG. 15), ii) that that the middle row is immediately below the virtual horizontal boundary (FIG. 24), iii) that the middle row is immediately above the row that is immediately above the virtual horizontal boundary (FIG. 16), or iv) that the middle row is immediately below the row that is immediately below the virtual horizontal boundary (FIG. 25).

Figure 15:
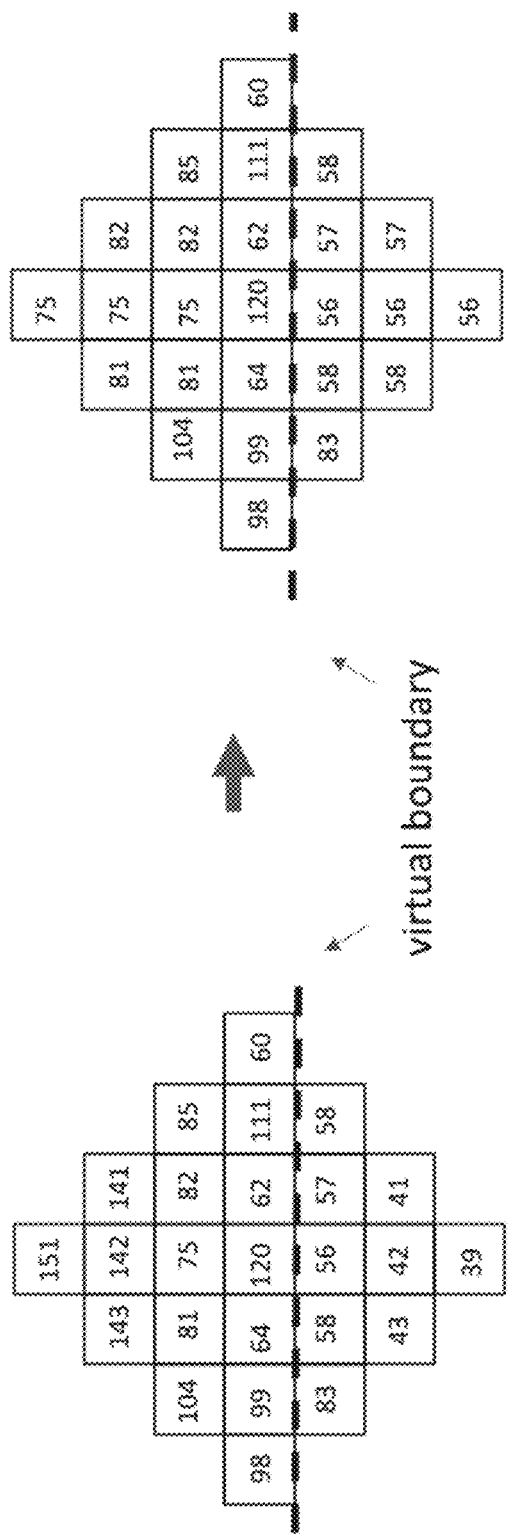
FIG. 15 shows a virtual horizontal boundary.
Figure 16:
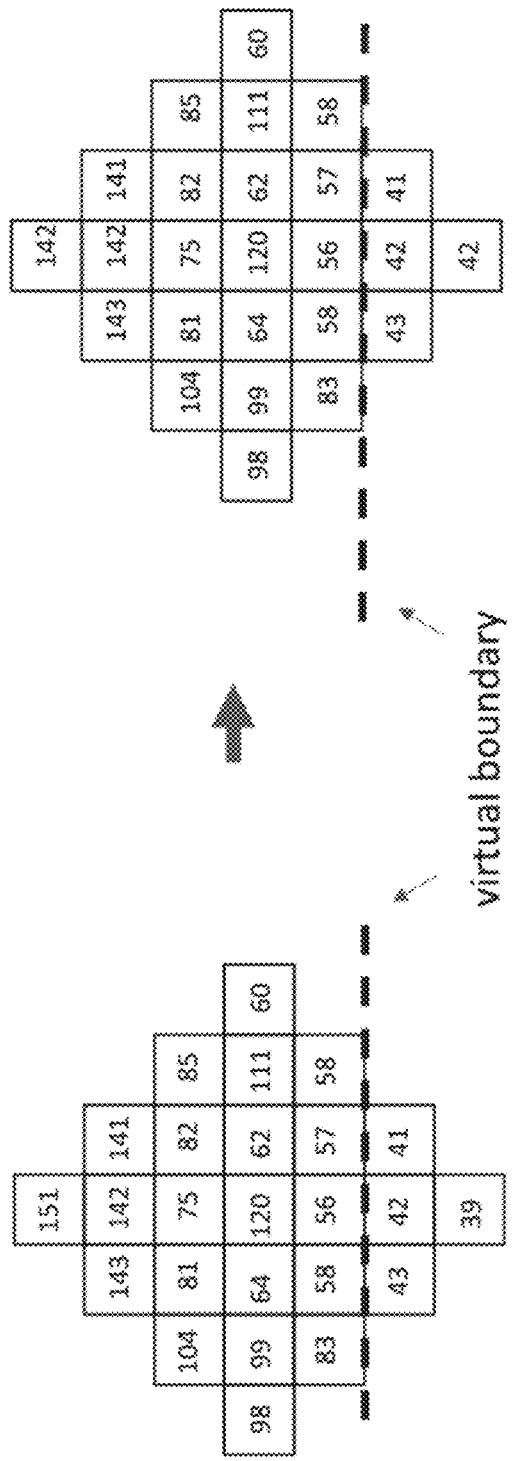
FIG. 16 shows a virtual horizontal boundary.
Figure 24:
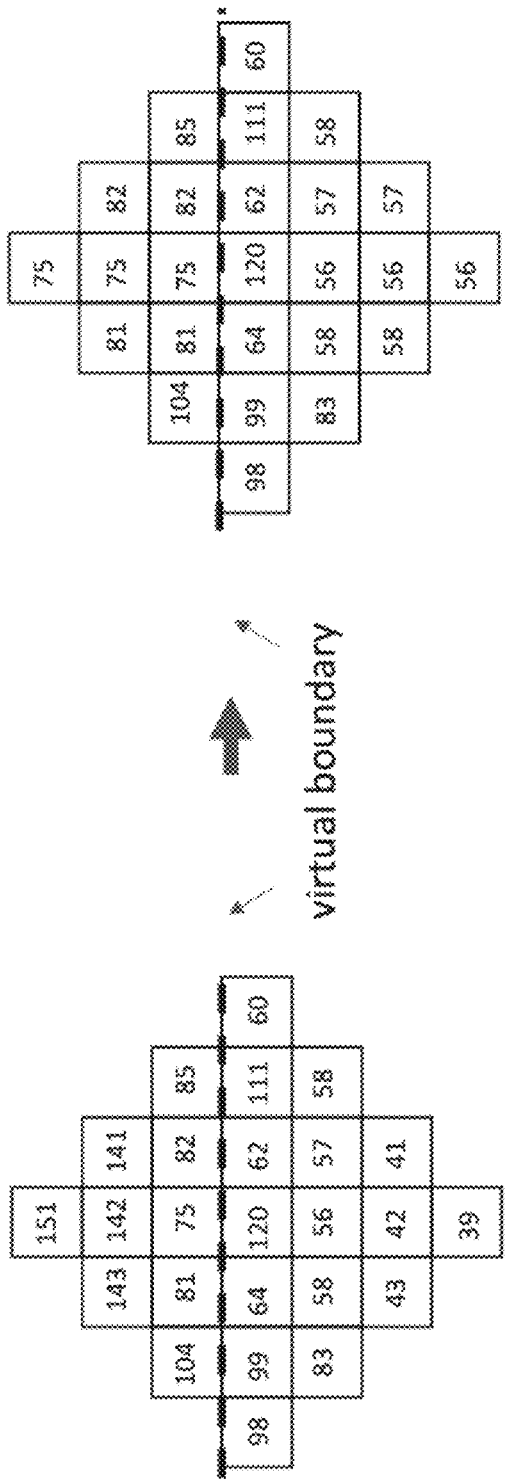
FIG. 24 shows a virtual horizontal boundary.
Figure 25:
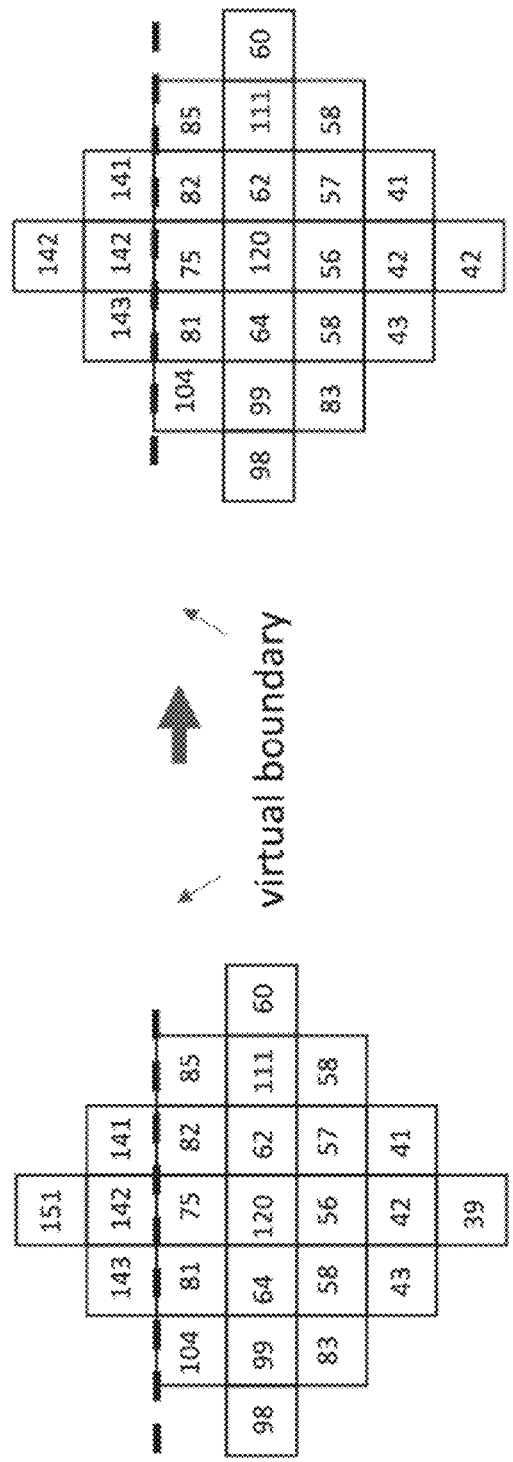
FIG. 25 shows a virtual horizontal boundary.

Step s2008 comprises applying ALF filtering of the current sample value based on samples only from: i) the middle row, ii) the row immediately below the middle row, and iii) the row immediately above the middle row if the middle row is determined to be immediately above or immediately below the virtual horizontal boundary (FIG. 15 and FIG. 24).

Step s2010 comprises applying ALF filtering of the current sample value based on samples only from: i) the middle row, ii) the two rows immediately above the middle row, and iii) the two rows immediately below the below row if the middle row is determined to be immediately above the row that is immediately above the virtual horizontal boundary or determined to be immediately below the row that is immediately below the virtual horizontal boundary (FIG. 16 and FIG. 25).

In some embodiments, the virtual horizontal boundary for luma is five samples above the horizontal block boundary.

In some embodiments, the virtual horizontal boundary for chroma is three samples above the horizontal block boundary.

Figure 21:
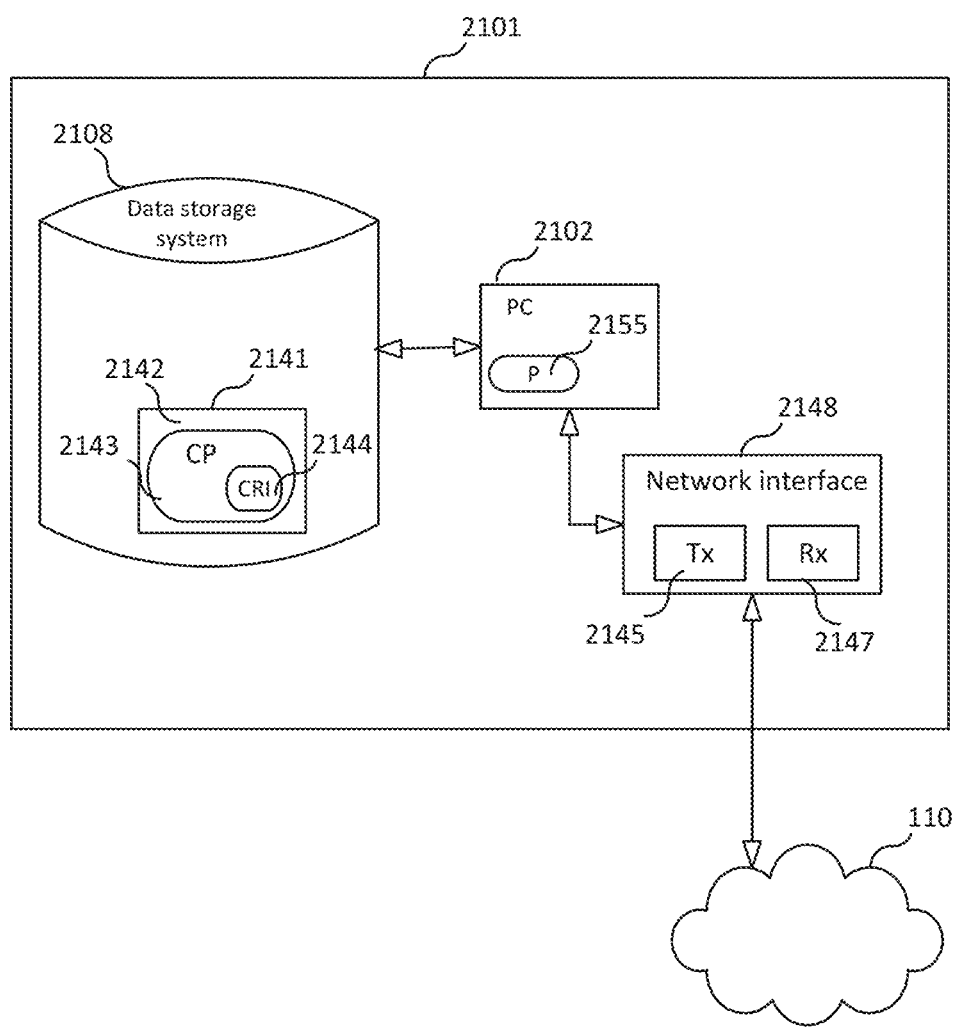
FIG. 21 is a block diagram of an apparatus according to some embodiments.

FIG. 21 is a block diagram of an apparatus 2101 for implementing encoder 502 or decoder 504, according to some embodiments. That is, apparatus 2101 can be adapted to perform the methods disclosed herein. In embodiments where apparatus 2101 implements encoder 502, apparatus 2101 may be referred to as "encoding apparatus 2101," and in embodiments where apparatus 2101 implements decoder 504, apparatus 2101 may be referred to as a "decoding apparatus 2101." As shown in FIG. 21, apparatus 2101 may comprise: processing circuitry (PC) 2102, which may include one or more processors (P) 2155 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed; one or more network interfaces 2148 (which may be co-located or geographically distributed) where each network interface includes a transmitter (Tx) 2145 and a receiver (Rx) 2147 for enabling apparatus 2101 to transmit data to and receive data from other nodes connected to network 110 (e.g., an Internet Protocol (IP) network) to which network interface 2148 is connected; and one or more storage units (a.k.a., "data storage systems") 2108 which may be co-located or geographically distributed and which may include one or more non-volatile storage devices and/or one or more volatile storage devices. In embodiments where PC 2102 includes a programmable processor, a computer program product (CPP) 2141 may be provided. CPP 2141 includes a computer readable medium (CRM) 2142 storing a computer program (CP) 2143 comprising computer readable instructions (CRI) 2144. CRM 2142 may be a non-transitory computer readable medium, such as, magnetic media (e.g., a hard disk), optical media, memory devices (e.g., random access memory, flash memory), and the like. In some embodiments, the CRI 2144 of computer program 2143 is adapted such that when executed by PC 2102, the CRI causes apparatus 2101 to perform steps described herein (e.g., steps described herein with reference to the flow charts). In other embodiments, apparatus 2101 may be adapted to perform steps described herein without the need for code. That is, for example, PC 2102 may consist merely of one or more ASICs. Hence, the features of the embodiments described herein may be implemented in hardware and/or software.

The embodiments disclosed herein avoid introducing artifacts from the filtering by reducing the amount of filtering for ALF at virtual CTU boundaries and boundaries adjacent to the virtual CTU boundaries. Below are objective results showing realized improvements.

Results

Objective results (BDR where negative number is improvement) for embodiment 1 in comparison to VTM-7.0 (VVC reference software) as follows:

|  | Y | U | V |
|---|---|---|---|
| All Intra | | | |
| Class A1 | 0.01% | 0.07% | 0.11% |
| Class A2 | 0.01% | 0.04% | 0.05% |
| Class B | 0.01% | 0.03% | 0.04% |
| Class C | −0.01% | 0.04% | 0.04% |
| Class E | 0.01% | 0.08% | 0.09% |
| Overall | 0.01% | 0.05% | 0.06% |
| Class D | 0.00% | 0.02% | 0.03% |
| Class F | 0.00% | 0.04% | 0.04% |
| Random access | | | |
| Class A1 | 0.02% | 0.06% | 0.03% |
| Class A2 | 0.02% | 0.04% | 0.14% |
| Class B | 0.03% | 0.09% | 0.12% |
| Class C | −0.04% | 0.00% | −0.03% |
| Class E | | | |
| Overall | 0.01% | 0.05% | 0.06% |
| Class D | 0.00% | 0.11% | 0.16% |
| Class F | #VALUE! | #VALUE! | #VALUE! |
| Low delay B | | | |
| Class A1 | | | |
| Class A2 | | | |
| Class B | 0.03% | −0.21% | 0.02% |
| Class C | −0.04% | −0.28% | −0.07% |
| Class E | −0.11% | 0.16% | −0.08% |
| Overall | −0.03% | −0.14% | −0.03% |
| Class D | −0.04% | 0.45% | 0.00% |
| Class F | 0.00% | −0.52% | 0.16% |

Objective results for embodiment 2 in comparison to VTM-7.0 (VVC reference software at the time of the invention) as follows:

|  | Y | U | V |
|---|---|---|---|
| All Intra | | | |
| Class A1 | 0.01% | 0.04% | 0.07% |
| Class A2 | 0.01% | 0.02% | 0.03% |
| Class B | 0.01% | 0.02% | 0.03% |
| Class C | −0.01% | 0.03% | 0.02% |
| Class E | 0.01% | 0.05% | 0.06% |
| Overall | 0.00% | 0.03% | 0.04% |
| Class D | 0.00% | 0.01% | 0.02% |
| Class F | −0.01% | 0.03% | 0.02% |
| Random access | | | |
| Class A1 | 0.02% | −0.01% | 0.03% |
| Class A2 | 0.00% | 0.10% | 0.09% |
| Class B | 0.01% | 0.13% | 0.11% |
| Class C | −0.01% | −0.03% | −0.06% |
| Class E | | | |
| Overall | 0.00% | 0.05% | 0.04% |
| Class D | 0.00% | 0.07% | 0.06% |
| Class F | −0.04% | −0.01% | −0.01% |
| Low delay B | | | |
| Class A1 | | | |
| Class A2 | | | |
| Class B | 0.01% | −0.24% | 0.32% |
| Class C | 0.04% | −0.15% | 0.02% |
| Class E | 0.01% | 0.72% | −0.03% |
| Overall | 0.02% | 0.03% | 0.13% |
| Class D | 0.00% | −0.18% | −0.15% |
| Class F | 0.05% | 0.07% | 0.24% |

Figure 22:
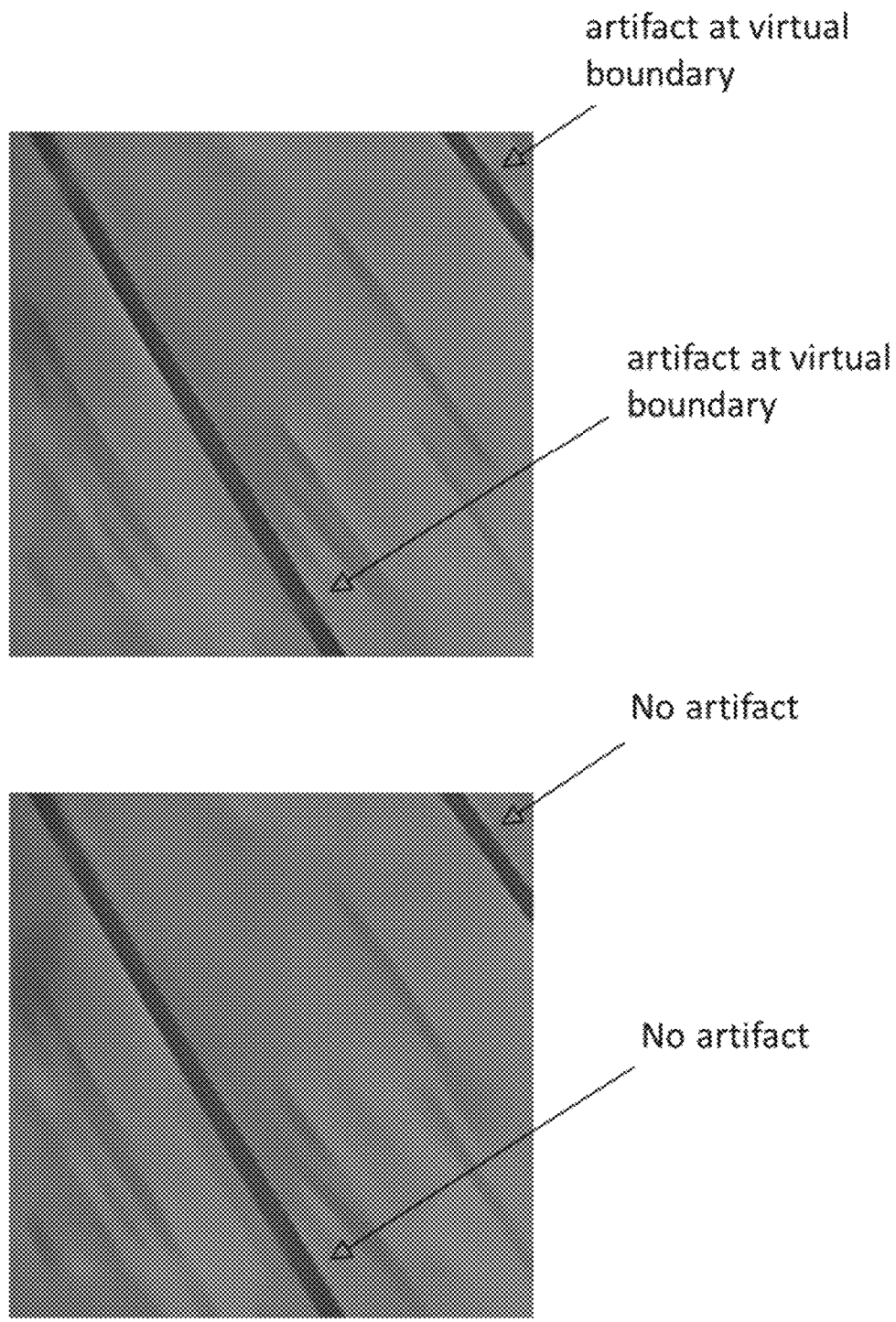
FIG. 22 shows processed images.

FIG. 22 shows a first image processed the conventional way (left image) and a second image (bottom image) processed according to embodiment 1. The first image has an artifact (blurring of line) at a virtual boundary due to ALF.

The second image does not include the artifact. Thus the second image is a higher quality version of the original image than the first image.

Figure 23:
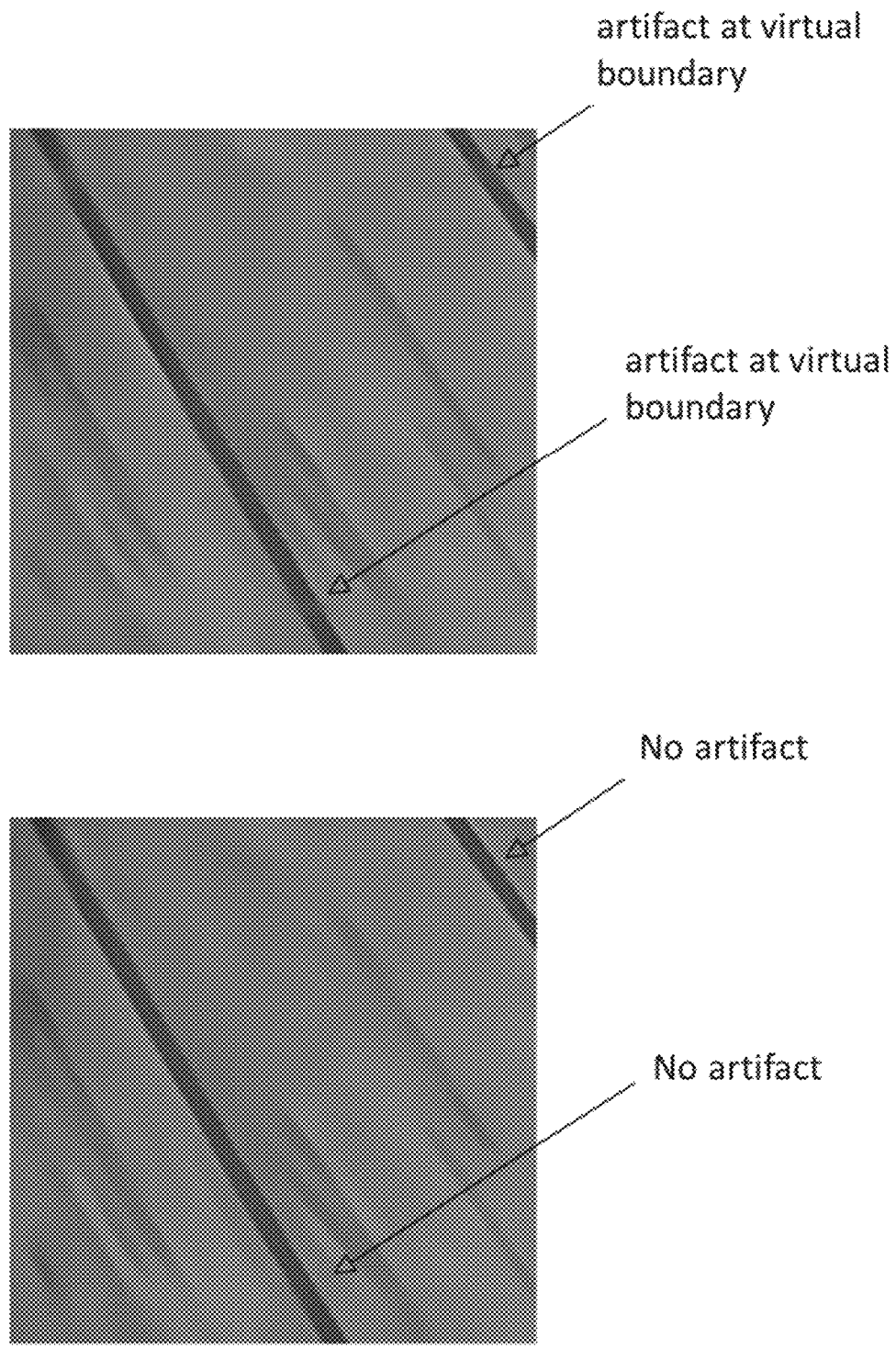
FIG. 23 shows processed images.

FIG. 23 shows a first image processed the conventional way (left image) and a second image (bottom image) processed according to embodiment 2. The first image has an artifact (blurring of line) at a virtual boundary due to ALF. The second image does not include the artifact. Thus the second image is a higher quality version of the original image than the first image.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] Misra, et al., "Cross-Component Adaptive Loop Filter for chroma," JVET-O0636_r1, July 2019 (available at phenix.it-sudparis.eu/jvet/doc_end_user/documents/15_Gothenburg/wg11/JVET-O0636-v2.zip).

[2] Chen, "Description of Core Experiment 5 (CE5): Cross-component adaptive loop filtering," JVET-P2025-v4, October 2019 (available at phenix.it-sudparis.eu/jvet/doc_end_user/documents/16_Geneva/wg11/JVET-P2025-v4.zip).

The invention claimed is:

1. A method for encoding or decoding an image, the method comprising:
    obtaining a block of sample values associated with the image, the block of sample values comprising a current sample value having a location (x,y) within the block, where x indicates a column of the block in which the current sample is located and y indicates a row of the block in which the current sample is located;
    selecting a filter strength value for the current sample based on y; and
    filtering the current sample using the selected filter strength value, wherein
    selecting a filter strength value for the current sample based on y comprises:
        i) determining whether a condition is true; and
        ii) choosing a filter strength value of 10 as a result of determining that the condition is true, wherein determining whether the condition is true comprises determining, based on y, whether the sample value is located either in a first particular row of the block or a second particular row of the block.

2. The method of claim 1, wherein
    filtering the current sample based on the selected filter strength value comprises calculating:
    curr+((sum+(1<<9))>>10), where curr is the value of the current sample and sum is a function of curr.

3. The method of claim 2, wherein the current sample is a luma sample.

4. The method of claim 3, wherein sum is a function of curr and a luma filter coefficient.

5. The method of claim 4, wherein sum is determined based on curr, the luma filter coefficient, and a luma clipping value.

6. An apparatus, the apparatus comprising:
    processing circuitry; and
    a memory, the memory containing instructions executable by the processing circuitry, wherein the apparatus is configured to:
    obtain a block of sample values associated with the image, the block of sample values comprising a current sample value having a location (x,y) within the block, where x indicates a column of the block in which the current sample is located and y indicates a row of the block in which the current sample is located;
    select a filter strength value for the current sample based on y; and
    filter the current sample using the selected filter strength value, wherein
    selecting a filter strength value for the current sample based on y comprises:
        i) determining whether a condition is true, and
        ii) choosing a filter strength value of 10 as a result of determining that the first condition is true, wherein determining whether the condition is true comprises determining, based on y, whether the sample value is located either in a first particular row of the block or a second particular row of the block.

7. The apparatus of claim 6, wherein
    filtering the current sample based on the selected filter strength value comprises calculating:
    curr+((sum+(1<<9))>>10), where curr is the value of the current sample and sum is a function of curr.

8. The apparatus of claim 7, wherein the current sample is a luma sample.

9. The apparatus of claim 8, wherein sum is a function of curr and a luma filter coefficient.

10. The apparatus of claim 9, wherein sum is determined based on curr, the luma filter coefficient, and a luma clipping value.

11. A video decoder, the video decoder comprising:
    processing circuitry; and
    a memory, the memory containing instructions executable by the processing circuitry, wherein the video decoder is configured to:
    receive a bitstream;
    obtain a block of sample values associated with the image, the block of sample values comprising a current sample value having a location (x,y) within the block, where x indicates a column of the block in which the current sample is located and y indicates a row of the block in which the current sample is located;
    select a filter strength value for the current sample based on y; and
    filter the current sample using the selected filter strength value, wherein
    selecting a filter strength value for the current sample based on y comprises:
        i) determining whether a condition is true, and
        ii) choosing a filter strength value of 10 as a result of determining that the first condition is true, wherein determining whether the condition is true comprises determining, based on y, whether the sample value is located either in a first particular row of the block or a second particular row of the block.

12. The video decoder of claim 11, wherein
filtering the current sample based on the selected filter strength value comprises calculating:
curr+((sum+(1<<9))>>10), where curr is the value of the current sample and sum is a function of curr.

13. The video decoder of claim 12, wherein the current sample is a luma sample.

14. The video decoder of claim 13, wherein sum is a function of curr and a luma filter coefficient.

15. The video decoder of claim 14, wherein sum is determined based on curr, the luma filter coefficient, and a luma clipping value.

16. A computer program product (CPP) comprising non-transitory computer readable medium storing a computer program comprising instructions which when executed by processing circuitry causes the processing circuitry to perform a method comprising:
obtaining a block of sample values associated with the image, the block of sample values comprising a current sample value having a location (x,y) within the block, where x indicates a column of the block in which the current sample is located and y indicates a row of the block in which the current sample is located;
selecting a filter strength value for the current sample based on y; and
filtering the current sample using the selected filter strength value, wherein
selecting a filter strength value for the current sample based on y comprises:
i) determining whether a condition is true, and
ii) choosing a filter strength value of 10 as a result of determining that the first condition is true, wherein
determining whether the condition is true comprises determining, based on y, whether the sample value is located either in a first particular row of the block or a second particular row of the block.

17. The CPP of claim 16, wherein
filtering the current sample based on the selected filter strength value comprises calculating:
curr+((sum+(1<<9))>>10), where curr is the value of the current sample and sum is a function of curr.

18. The CPP of claim 17, wherein the current sample is a luma sample.

19. The CPP of claim 18, wherein sum is a function of curr and a luma filter coefficient.

20. The CPP of claim 19, wherein sum is determined based on curr, the luma filter coefficient, and a luma clipping value.

21. The decoder of claim 11, wherein
the block is a coding tree block (CTB),
the block has a number of rows (CtbSizeY) and a number of columns (CtbSizeX),
determining, based on y, that the sample value is located in either the first particular row of the block or the second particular row of the block comprises determining that
y equals (CtbSizeY−4) or y equals (CtbSizeY−5).

* * * * *

UNITED STATES PATENT AND TRADEMARK OFFICE
CERTIFICATE OF CORRECTION

PATENT NO. : 12,101,484 B2
APPLICATION NO. : 18/143156
DATED : September 24, 2024
INVENTOR(S) : Kenneth Andersson et al.

It is certified that error appears in the above-identified patent and that said Letters Patent is hereby corrected as shown below:

In the Specification

In Columns 3 & 4, Line 34, delete "0..CtbSize Y" and insert -- 0..CtbSizeY --, therefor.

In Columns 7 & 8, under "TABLE 43-continued", Line 3, delete "hx + i and vy + j" and insert -- $h_{x+i}$ and $v_{y+j}$ --, therefor.

In Columns 7 & 8, under "TABLE 43-continued", Line 4, delete "(hx + i, vy + j)," and insert -- ($h_{x+i}$, $v_{y+j}$), --, therefor.

In Columns 7 & 8, under "TABLE 43-continued", Line 8, delete "CtbSize Y" and insert -- CtbSizeY --, therefor.

In Columns 7 & 8, under "TABLE 43-continued", Line 16, delete "[1], c[idx[1]," and insert -- [1]], c[idx[1]], --, therefor.

In Columns 7 & 8, under "TABLE 43-continued", Line 20, delete "[3], c[idx[3]," and insert -- [3]], c[idx[3]], --, therefor.

In Columns 7 & 8, under "TABLE 43-continued", Line 22, delete "[4], c[idx[4]," and insert -- [4]], c[idx[4]], --, therefor.

In Columns 7 & 8, under "TABLE 43-continued", Line 31, delete "[8], c[idx[8]," and insert -- [8]], c[idx[8]], --, therefor.

In Columns 7 & 8, under "TABLE 43-continued", Line 31, delete "curr)" and insert -- curr)) --, therefor.

In Column 10, Line 42, delete "$\Delta l_i(x, y)$." and insert -- $\Delta I_i(x, y)$. --, therefor.

Signed and Sealed this
Eighteenth Day of February, 2025

Coke Morgan Stewart
*Acting Director of the United States Patent and Trademark Office*

CERTIFICATE OF CORRECTION (continued)
U.S. Pat. No. 12,101,484 B2

In Column 10, Line 67, delete "position i" and insert -- position --, therefor.

In Column 11, Line 7, delete "$\Delta l_i(x, y)$" and insert -- $\Delta I_i(x, y)$ --, therefor.

In Column 11, Line 9, delete "$\Delta l_i(x, y)$" and insert -- $\Delta I_i(x, y)$ --, therefor.

In Column 11, Line 12, delete "shitFactor" and insert -- shiftFactor --, therefor.

In Column 11, Line 19, delete "$C_L2=(-1)*(C_L0+C_L1+C_L3++C_L5+C_L6+C_L7)$" and insert -- $C_L2=(-1)*(C_L0+C_L1+C_L3+C_L4+C_L5+C_L6+C_L7)$ --, therefor.

In Column 11, Line 23, delete "$\Delta l_i(x, y)$" and insert -- $\Delta I_i(x, y)$ --, therefor.

In Column 11, Line 26, delete "$R_F(x_C, y_C)=\Delta l_i(x, y)+R_C(x_C, y_C)$," and insert -- $R_F(x_C, y_C)=\Delta I_i(x, y)+R_C(x_C, y_C)$, --, therefor.

In Column 15, Line 21, delete "VCC" and insert -- VVC --, therefor.

In Column 15, Line 36, delete "$[h_{x-+x1}$," and insert -- $[h_{x-1+x1}$ --, therefor.

In Column 16, Lines 23-24, delete "$I_{FILTERED}=[5*I_{LEFT}+6*I_{CENTER})+5*I_{RIGHT}]/16$," and insert -- $I_{FILTERED}=[5*I_{LEFT}+6*I_{CENTER}+5*I_{RIGHT}]/16$, --, therefor.

In Column 16, Lines 29-30, delete "$I_{FILTERED}=I_{CENTER}+[5*(I_{LEFT}\ I_{CENTER})+5*(I_{RIGHT}-I_{CENTER})]/32.$" and insert -- $I_{FILTERED}=I_{CENTER}+[5*(I_{LEFT}-I_{CENTER})+5*(I_{RIGHT}-I_{CENTER})]/32.$ --, therefor.

In Column 16, Lines 31-32, delete "$I_{FILTERED}=[5*I_{LEFT}+22*I_{CENTER})+5*I_{RIGHT}]/32$," and insert -- $I_{FILTERED}=[5*(I_{LEFT}+22*I_{CENTER})+5*I_{RIGHT}]/32$, --, therefor.

In Column 19, Line 52, delete "$[h_{x-+x1}$," and insert -- $[h_{x-1+x1}$ --, therefor.

In Column 20, Line 53, delete "sum=curr+((sum+64)>>(7+alfShiftOffset)" and insert -- sum=curr+((sum+64)>>7+alfShiftOffset) --, therefor.

In Column 21, Line 25, delete "distant" and insert -- distance --, therefor.

In Column 22, Line 30, delete "CtbSize Y" and insert -- CtbSizeY --, therefor.

In Column 22, Line 33, delete "CtbSize Y" and insert -- CtbSizeY --, therefor.

In Columns 23 & 24, Line 42, delete "( CtbSize Y" and insert -- ( CtbSizeY --, therefor.

In Columns 23 & 24, Line 48, delete "( CtbSize Y" and insert -- ( CtbSizeY --, therefor.

In the Claims

In Column 32, Line 26, in Claim 6, delete "first condition" and insert -- condition --, therefor.

In Column 34, Line 20, in Claim 21, delete "decoder" and insert -- video decoder --, therefor.